(12) United States Patent
Piemonte

(10) Patent No.: US 9,418,466 B2
(45) Date of Patent: Aug. 16, 2016

(54) GEOSPATIAL REPRESENTATION OF DATA-LESS MAP AREAS

(71) Applicant: Apple Inc., Cupertino, CA (US)

(72) Inventor: Patrick S. Piemonte, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 838 days.

(21) Appl. No.: 13/632,043

(22) Filed: Sep. 30, 2012

(65) Prior Publication Data

US 2013/0328862 A1 Dec. 12, 2013

Related U.S. Application Data

(60) Provisional application No. 61/656,032, filed on Jun. 6, 2012, provisional application No. 61/656,043, filed on Jun. 6, 2012, provisional application No. 61/657,880, filed on Jun. 10, 2012, provisional application No. 61/699,803, filed on Sep. 11, 2012.

(51) Int. Cl.
  *G06T 15/00* (2011.01)
  *G06T 17/05* (2011.01)
  *G01C 21/34* (2006.01)
  *G01C 21/36* (2006.01)

(52) U.S. Cl.
  CPC ............ *G06T 15/00* (2013.01); *G01C 21/3638* (2013.01); *G06T 17/05* (2013.01)

(58) Field of Classification Search
  None
  See application file for complete search history.

(56) References Cited

U.S. PATENT DOCUMENTS

| | | |
|---|---|---|
| 5,848,375 A | 12/1998 | Nunobiki et al. |
| 6,163,269 A | 12/2000 | Millington et al. |
| 6,496,189 B1 | 12/2002 | Yaron et al. |
| 7,379,811 B2 | 5/2008 | Rasmussen et al. |
| 7,551,172 B2 | 6/2009 | Yaron et al. |
| 7,746,343 B1 | 6/2010 | Charaniya et al. |
| 8,237,713 B2 | 8/2012 | Yaron et al. |

(Continued)

FOREIGN PATENT DOCUMENTS

WO PCT/US2013/042546 5/2013
WO WO 2013/184391 12/2013

OTHER PUBLICATIONS

"Today's Navigation Standard" http://www.casanovasadventures.com/catalog/gps/p3034.htm Archived on Jan. 6, 2005. Retrieved on May 28, 2015 from <http://web.archive.org/web/20050106232808/http://www.casanovasadventures.com/catalog/gps/p3034.htm>.*

(Continued)

*Primary Examiner* — Zhengxi Liu
(74) *Attorney, Agent, or Firm* — Adeli LLP

(57) ABSTRACT

Some embodiments provide a non-transitory machine-readable medium that stores a mapping application which when executed on a device by at least one processing unit renders views of a three-dimensional (3D) map. The mapping application requests a first set of map tiles associated with a portion of the 3D map. In response to the request, the mapping application receives a second set of map tiles associated with portion of the 3D map. The mapping application identifies a third set of map tiles included in the first set of map tiles but not included in the second set of map tiles. For each map tile in the third set of map tiles, the mapping application generates a replacement map tile comprising geospatial data. The mapping application renders the portion of the 3D map based on the second set of map tiles and the set of replacement map tiles.

23 Claims, 11 Drawing Sheets

(56) References Cited

U.S. PATENT DOCUMENTS

| | | | |
|---|---|---|---|
| 8,681,176 | B1 | 3/2014 | Maurer et al. |
| 8,738,284 | B1 | 5/2014 | Jones |
| 2004/0176908 | A1 | 9/2004 | Senda et al. |
| 2005/0049786 | A1 | 3/2005 | Odachi et al. |
| 2007/0080830 | A1 | 4/2007 | Sacks |
| 2008/0016145 | A1 | 1/2008 | Takase et al. |
| 2008/0238941 | A1* | 10/2008 | Kinnan et al. ............... 345/630 |
| 2009/0028440 | A1* | 1/2009 | Elangovan et al. ........... 382/216 |
| 2009/0198767 | A1 | 8/2009 | Jakobson et al. |
| 2010/0002007 | A1 | 1/2010 | Rajagopalan |
| 2010/0100310 | A1 | 4/2010 | Eich et al. |
| 2010/0250536 | A1 | 9/2010 | Broadbent |
| 2011/0131376 | A1* | 6/2011 | Fischer ........................ 711/119 |
| 2012/0050489 | A1 | 3/2012 | Gupta et al. |
| 2012/0206469 | A1 | 8/2012 | Hulubei et al. |
| 2012/0209518 | A1 | 8/2012 | Nowak et al. |
| 2013/0021382 | A1 | 1/2013 | Morlock et al. |
| 2013/0076784 | A1 | 3/2013 | Maurer et al. |

OTHER PUBLICATIONS

"Google Earth API" https://developers.google.com/earth/documentation/camera_control. Archived on Mar. 26, 2012. Retrieved on Apr. 20, 2015 from <https://web.archive.org/web/20120326235132/https://developers.google.com/earth/documentation/camera_control>.*

"Adaptive ArcGIS Server Tile Cache for Virtual Earth", published on Jan. 17, 2008, retrieved from http://blog.davebouwman.com/2008/01/17/adaptive-arcgis-server-tile-cache-for-virtual-earth/ on Dec. 21, 2015.*

Hu. Jiuxiang, et al., "Road Network Extraction and Intersection Detection From Aerial Images by Tracking Road Footprints", IEEE Transactions on Geoscience and Remote Sensing, Dec. 2007, pp. 4144-4157, vol. 45, No. 12, IEEE.

Poullis, Charalambos, et al., "Delineation and geometric modeling of road networks", ISPRS Journal of Photogrammetry and Remote Sensing, Month Unknown, 2010, pp. 165-181, vol. 65, Computer Graphics and Immersive Technologies Lab, Integrated Media Systems Center, University of Southern California, United States.

International Search Report and Written Opinion for PCT/US2013/042546, Nov. 6, 2013 (mailing date), Apple Inc.

Author Unknown, "(SC4) Sim City for Highways & Autobahns," Aug. 12, 2011, pp. 1-35, available at http://www.skyscrapercity.com/showthread.php?t=639496&page=14.

Author Unknown, "Resolve Road Conflicts (Cartography)," ARCGIS help 10.1, Nov. 11, 2011, 4 pages, Esri, available at http://help.arcgis.com/en/arcgisdesktop/10.0/help/index.html#//007000000019000000.htm.

* cited by examiner

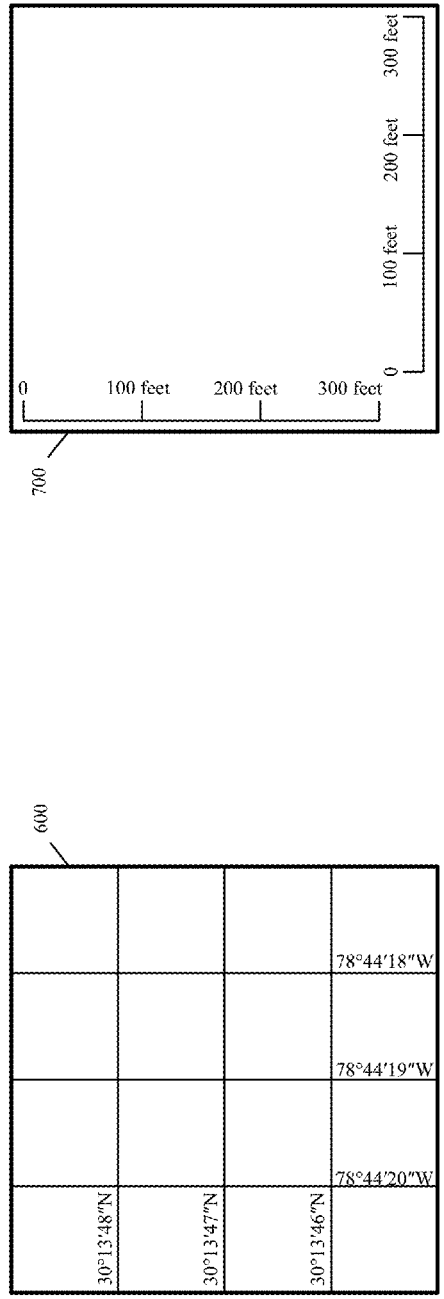
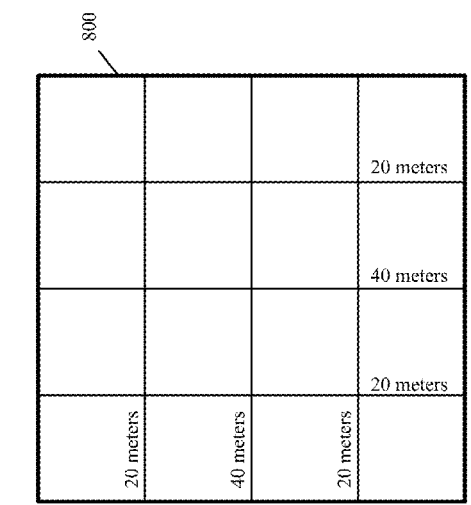
*Figure 7*
*Figure 8*
*Figure 6*

GEOSPATIAL REPRESENTATION OF DATA-LESS MAP AREAS

CLAIM OF BENEFIT TO PRIOR APPLICATIONS

This application claims the benefit of U.S. Provisional Patent Application 61/656,032, filed Jun. 6, 2012; U.S. Provisional Patent Application 61/656,043, filed Jun. 6, 2012; U.S. Provisional Patent Application 61/657,880, filed Jun. 10, 2012; and U.S. Provisional Patent Application 61/699,803, filed Sep. 11, 2012. U.S. Provisional Patent Applications 61/656,032, 61/656,043, 61/657,880, and 61/699,803 are incorporated herein by reference.

BACKGROUND

Many computing devices (e.g., tablet computing devices, smartphones, laptops, etc.) today can access information from a variety of different locations. For example, many devices are capable of communicating wirelessly and, thus, can access information at home, at work, at public hotspots, at airports, on airplanes, etc.

Users of these devices often install or use a native mapping application for viewing maps. Typically, the mapping application utilizes data stored remotely (e.g., a server). When the devices can connect to the data (e.g., via the Internet), the user may view the map. However, the devices cannot access the data, the mapping application is unable to display portions of the map, or sometimes the entire map altogether.

BRIEF SUMMARY

For a mapping application, some embodiments of the invention provide a novel method for rendering views of a three-dimensional (3D) map. In some embodiments, when rendering a view of the 3D map, the method identifies a portion of the 3D map to use for rendering the view. For the identified portion of the 3D map, the method of some embodiments identifies (1) a set of sections of the 3D map for which data is unavailable (also referred to as data-less sections) and (2) a set of sections of the map view for which data is available. Based on sections for which data is available, the method generates for the data-less sections filler sections that include geospatial information. In some embodiments, the method fills the data-less sections with the corresponding filler section. The method of some embodiments then renders the view of the 3D map.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

FIG. 6 conceptually illustrates an example presentation of geospatial information according to some embodiments of the invention.

FIG. 7 conceptually illustrates another example presentation of geospatial information according to some embodiments of the invention.

FIG. 8 conceptually illustrates another example presentation of geospatial information according to some embodiments of the invention.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

For a mapping application, some embodiments of the invention provide a novel method for rendering views of a three-dimensional (3D) map. In some embodiments, when rendering a view of the 3D map, the method identifies a portion of the 3D map to use for rendering the view. For the identified portion of the 3D map, the method of some embodiments identifies (1) a set of sections of the 3D map for which data is unavailable (also referred to as data-less sections) and (2) a set of sections of the map view for which data is available. Based on sections for which data is available, the method generates for the data-less sections filler sections that include geospatial information. In some embodiments, the method fills the data-less sections with the corresponding filler section. The method of some embodiments then renders the view of the 3D map.

Figure 1:
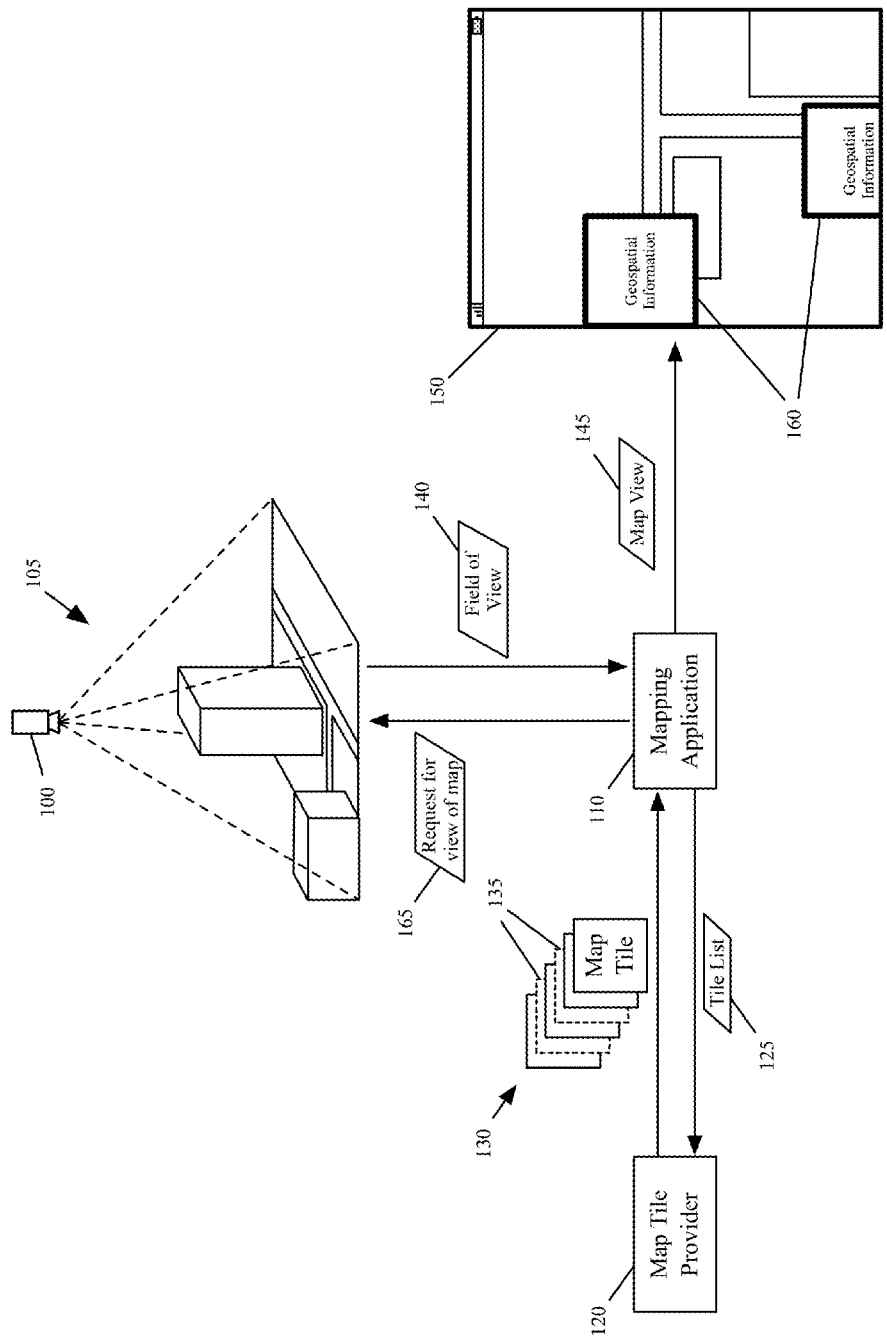
FIG. 1 conceptually illustrates a mapping application of some embodiments that generates geospatial map tiles for unavailable map tiles.

FIG. 1 conceptually illustrates a mapping application 110 of some embodiments that generates geospatial map tiles for unavailable map tiles. As shown, FIG. 1 illustrates the mapping application 110, a portion of a 3D map 105, a virtual camera 100, a map tile provider 120, and a 3D map view 150 of the 3D map 105.

In some embodiments, the mapping application 110 generates views of a 3D map for display on a device on which the mapping application 110 is operating. In this example, the mapping application 110 generates the 3D map view 150 of the 3D map 105. As shown, the 3D map 105 includes two buildings and two roads that form a T-junction.

The virtual camera 100 is a conceptualization of the position in the 3D map 105 from which the mapping application 110 renders the 3D map view 150. As illustrated in FIG. 1, the mapping application 110 sends a request 165 for a view of the 3D map 105 to render, and in response, the virtual camera 100 sends the mapping application 110 a field of view 140 (e.g., a viewing frustum) of the 3D map 105. Based on the field of view 140, the mapping application 110 identifies a set of map tiles 130 necessary to render the 3D map 105. The mapping application 110 then sends a tile list 125 of the set of map tiles 130 to the map tile provider 120.

The map tile provider 120 is responsible for retrieving map tiles requested by the mapping application 110. In some embodiments, the map tile provider 120 maintains a cache of map tiles (e.g., recently requested map tiles, often requested map tiles, etc.). Thus, the map tile provider 120 checks the cache of map tiles and retrieves any of the requested map tiles 130 that are available in the cache. For the requested map tiles 130 that are not available in the cache, the map tile provider 120 of some embodiments requests those tiles from a map service, such as the one described below by reference to FIG. 13.

In some instances, the map tile provider 120 cannot retrieve some of the requested map tiles 130. For example, the device on which the mapping application 110 is operating might not have a data connection because the cellular coverage of the area where the device is located has little or no coverage. After a defined amount of time or a defined number of attempts to retrieve the map tiles 130, the map tile provider 120 returns to the mapping application 110 the requested map tiles 130 that the map tile provider 120 was able to retrieve.

When the mapping application 110 receives the set of map tiles 130 from the map tile provider 120, the mapping application 110 renders the 3D map view 150. Details of rendering views of a 3D map are discussed below by reference to FIG. 10. In cases where the mapping application does not receive all of the requested map tiles 130, the mapping application 110 dynamically generates geospatial map tiles in place of the unavailable map tiles. As shown in this example, the mapping application 110 did not receive the map tiles 135 from the map tile provider 120. Thus, the mapping application 110 generates geospatial map tiles 160 to substitute for the unavailable map tiles 135 and then renders the map view 150 for display on the device.

As shown in FIG. 1, the sections of the 3D map 105 that correspond to the unavailable map tiles 135 are filled in by the geospatial map tiles 160. In some embodiments, the geospatial map tiles 160 include geospatial information to allow a user to visually determine distances in the 3D map view 150 in an easy and informative manner.

While FIG. 1 shows the map tile provider 120 and the mapping application 110 as separate modules, in some embodiments, the map tile provider 120 and the mapping application 110 are implemented as a single module that performs the functions of each of the modules while, in some embodiments, the map tile provider 120 and the mapping application 110 are implemented as separate applications.

Several figures (e.g., FIGS. 1 and 5) described above and below in this application show map views of a 3D map without user interface (UI) controls for purposes of simplicity and explanation. One of ordinary skill in the art will realize that the mapping application of some embodiments renders the map views with UI controls. For instance, in some embodiments, the mapping application renders the map views with the UI controls described below by reference to FIGS. 2-4.

Several more detailed embodiments of the invention are described in the sections below. Section I provides a description of several examples of operations on a 3D map that result in unavailable map tiles. Next, Section II conceptually describes an image processing pipeline of the mapping application of some embodiments. Section III follows this with a description of several electronic systems that implement some embodiments of the invention. Finally, Section IV describes a map service environment in which the mapping application of some embodiments operates.

I. Geospatial Map Tiles

As described above, in some embodiments, the mapping application provides a feature that presents geospatial information for sections of a 3D map for which map data is unavailable. The following section describes several exemplary scenarios in which the mapping application of some embodiments may generate geospatial map tiles for unavailable map tiles.

Figure 2:
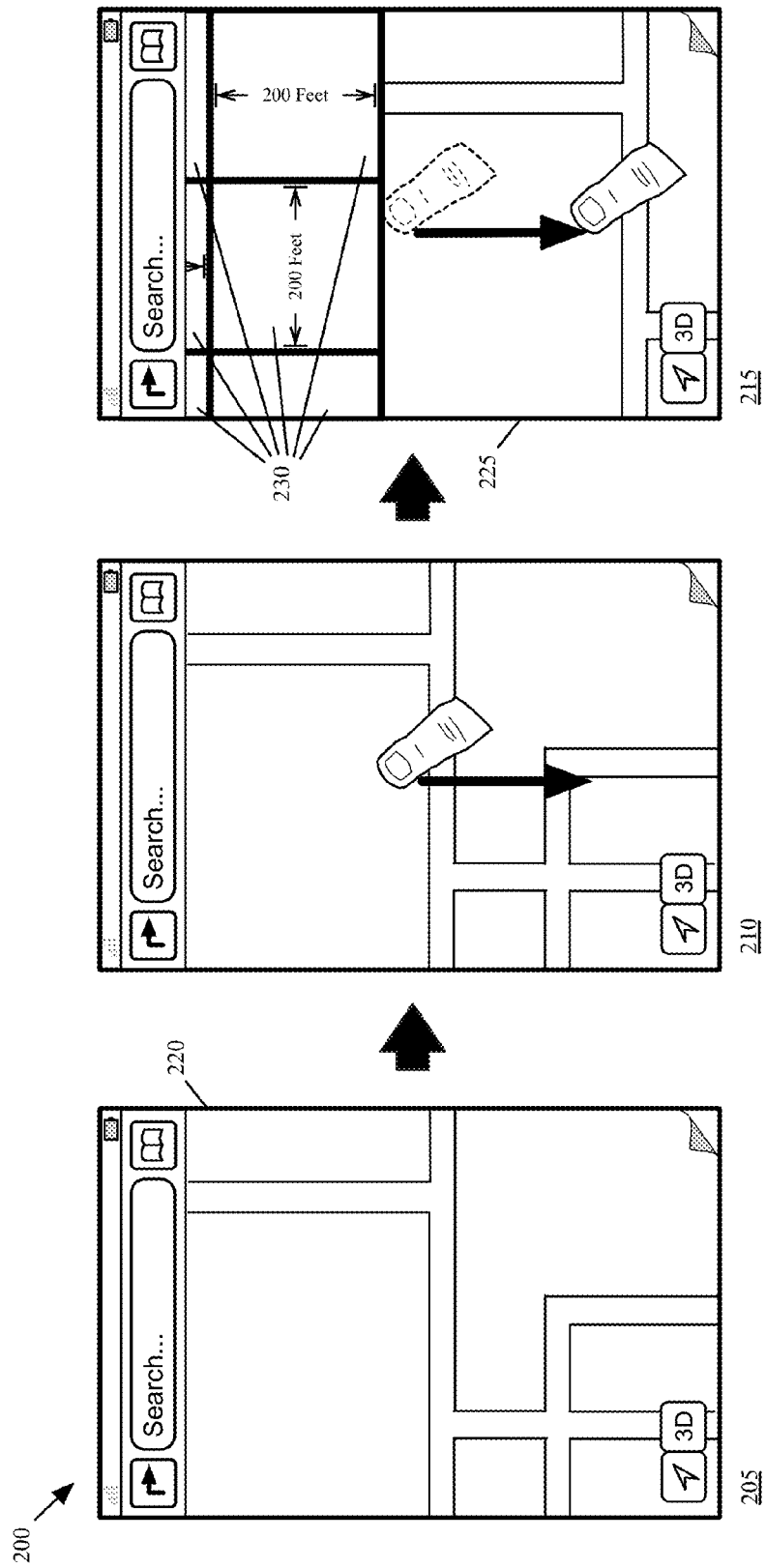
FIG. 2 conceptually illustrates a view of a 3D map that includes geospatial information after a panning operation according to some embodiments of the invention.

FIG. 2 conceptually illustrates a view of a 3D map with geospatial map tiles after a panning operation according to some embodiments of the invention. Specifically, FIG. 2 conceptually illustrates a GUI 200 at three different stages 205-215 of a panning operation.

As shown in the first stage 205, the GUI 200 includes several user interface (UI) controls and a two-dimensional (2D) view 220 of a 3D map (also referred to as an orthographic view or a top-down view). The 2D view 220 shows several streets running along a horizontal or perpendicular direction. In addition, the GUI 200 includes a signal strength icon in the top right corner that represents the strength of a connection (e.g., measured in decibel-milliwatt (dBm), etc.) between a device on which the mapping application is running and a network (e.g., a cellular network) within which the device is operating. In this example, the device does not have a connection with a network, as indicated by the signal strength icon completely grayed-out.

The second stage 210 illustrates a user providing input (e.g., a swipe gesture) to pan the 2D view 220 of the 3D map. Specifically, the user is touching a finger on a touchscreen of the device displaying the 2D view 220 and dragging the finger in a downward direction. In some embodiments, panning the 3D map (e.g., a defined distance) causes the mapping application to retrieve map tiles to render the new view of the 3D map to which the 3D map is panned. For this example, the view of the 3D map to which the user has panned causes the mapping application to retrieve map tiles for the new view of the 3D map.

In the third stage 215, the GUI 200 is displaying a 2D view 225 of the 3D map. As shown, the 2D view 225 illustrates the top portion of the 2D view 220 that was moved down as a result of the panning operation and a set of geospatial map tiles 230 above the top portion of the 2D view 220. To render the new portion of the 3D map in the 2D view 225 (i.e. the top section of the 2D view 225), the mapping application requested map tiles for the new portion of the 3D map. As noted above, in this example, the device does not have a connection with a network. Thus, the sections of the 2D view 225 at which the set of geospatial map tiles 230 are located represent map tiles that were not unavailable. The mapping application in this example generated and rendered the 2D view 225 with the set of geospatial map tiles 230.

Different embodiments use different techniques to generate geospatial map tiles. For example, the mapping application of some embodiments uses any of the techniques described above and below by reference to FIGS. 1, 9, and 10). Additionally, the mapping application in this example renders each geospatial map tile 230 with a bolding of the border and a distance indicator (200 feet in this example). The third stage 215 also shows that the mapping application rendered the distance indicators in the geospatial map tiles 230 in an alternating fashion—alternating between a horizontal distance indicator and a vertical distance indicator.

Figure 3:
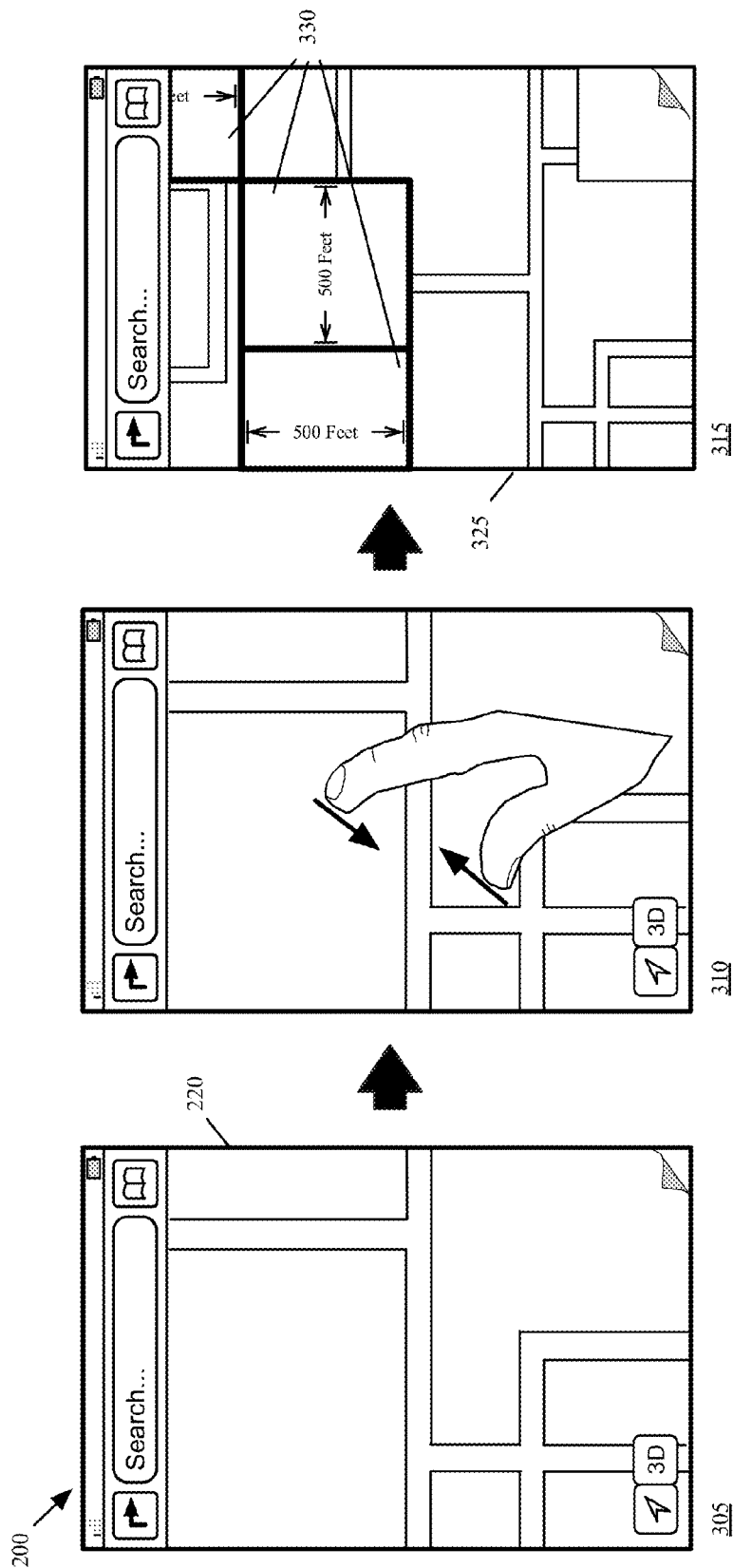
FIG. 3 conceptually illustrates a view of a 3D map that includes geospatial information after a zoom-out operation according to some embodiments of the invention.

FIG. 3 conceptually illustrates a view of a 3D map with geospatial map tiles after a zoom-out operation according to some embodiments of the invention. In particular, FIG. 3 conceptually illustrates the GUI 200 at three different stages 305-315 of a zoom-out operation.

The first stage 305 is similar to the first stage 205 described above by reference to FIG. 2. The GUI 200 at this stage 305 shows several UI controls and the 2D view 220 of the 3D map, which shows several streets running along a horizontal or perpendicular direction. However, instead of displaying the signal strength as indicating no signal, the signal strength icon in this example has one bar highlighted and the rest grayed-out to indicate that the device has a weak connection with the network.

The second stage 310 shows a user providing input (e.g., a pinch gesture) to zoom out from the 2D view 220 of the 3D map. In particular, the user is touching two fingers on the touchscreen of the device displaying the 2D view 220 and dragging the fingers closer together. In some embodiments, zooming out a defined amount of zoom levels (e.g., 1 zoom level, 3 zoom levels, etc.) from the 3D map causes the mapping application to retrieve a new set of map tiles to render the zoomed-out view of the 3D map. In this example, the user has provided input to zoom out past the defined amount of zoom levels from the 2D view 220. In this example, the view of the 3D map to which the user has zoomed out causes the mapping application to retrieve map tiles for the new view of the 3D map.

The third stage 315 shows the GUI 200 displaying a 2D view 325 of the 3D map. As illustrated, the 2D view 325 shows a portion of a zoomed-out view of the 2D view 220 and a set of geospatial map tiles 330. The mapping application renders the zoomed-out view of the 3D map by requesting map tiles for the 3D map at the new zoom level. As mentioned above, in this example, the connection between the device and the network is weak. As such, the sections of the 2D view 325 at which the set of geospatial map tiles 330 are located represent map tiles that were not unavailable, which caused the mapping application to generate and render the 2D view 325 with the set of geospatial map tiles 330.

As shown, the mapping application rendered each of the geospatial map tiles 330 with a bolding of the border and a distance indicator (500 feet in this example). The third stage 315 also shows that the mapping application rendered the distance indicators in the geospatial map tiles 330 in a similar alternating manner as described above by reference to FIG. 2.

Figure 4:
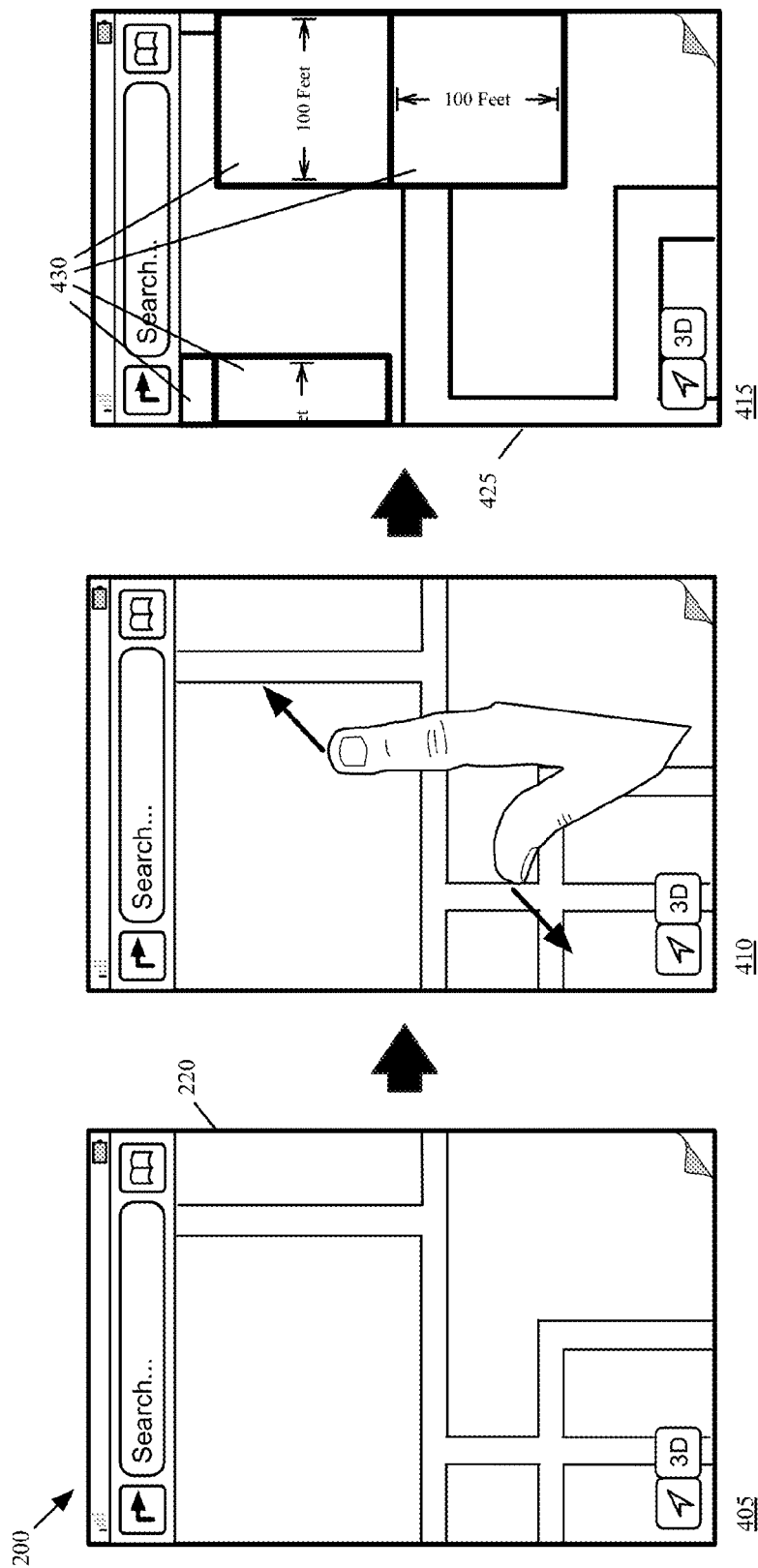
FIG. 4 conceptually illustrates a view of a 3D map that includes geospatial information after a zoom-in operation according to some embodiments of the invention.

FIG. 3 illustrates a situation where the mapping application provides geospatial map tiles when a 3D map is zoomed out. In some embodiments, a zoom-in operation causes the mapping application to present geospatial map tiles. FIG. 4 conceptually illustrates a view of a 3D map with geospatial map tiles after a zoom-in operation according to some embodiments of the invention. More specifically, FIG. 4 conceptually illustrates the GUI 200 at three different stages 405-415 of a zoom-in operation.

The first stage 405 is the same as the first stage 305 described above by reference to FIG. 3. That is, the GUI 200 is displaying several UI controls and the 2D view 220 of the 3D map and the signal strength icon has one bar highlighted to indicate that the device has a weak connection with the network.

In the second stage 410, the GUI 200 illustrates a user providing input (e.g., a spread gesture) to zoom into the 2D view 220 of the 3D map. Specifically, the user is touching two fingers on the touchscreen of the device displaying the 2D view 220 and dragging the fingers farther apart. In some embodiments, zooming in a defined amount of zoom levels (e.g., 1 zoom level, 2 zoom levels, etc.) into the 3D map causes the mapping application to retrieve a new set of map tiles to render the zoomed-in view of the 3D map. For this example, the user has provided input to zoom in past the defined amount of zoom levels into the 2D view 220. The view of the 3D map to which the user has zoomed into causes the mapping application for this example to retrieve map tiles for the new view of the 3D map.

The third stage 415 illustrates the GUI 200 displaying a 2D view 425 of the 3D map. The 2D view 425 shows a portion of a zoomed-in view of the 2D view 220 and a set of geospatial map tiles 430. The mapping application requests map tiles for the 3D map at the new zoom level in order to render the zoomed-in view of the 3D map. As described above, the connection between the device and the network is weak for this example. Accordingly, the sections of the 2D view 425 at which the set of geospatial map tiles 430 are located represent map tiles that were not unavailable. This caused the mapping application to generate and render the 2D view 425 with the set of geospatial map tiles 430.

The third stage 415 shows that the mapping application rendered each of the geospatial map tiles 430 with a bolding of the border and a distance indicator (100 feet in this example). In addition, the third stage 415 illustrates that the mapping application rendered the distance indicators in the geospatial map tiles 430 in a similar alternating manner as described above by reference to FIG. 2.

The above-described FIGS. 2-4 show examples of providing geospatial information for unavailable map tiles when the mapping application of some embodiments is viewing a 3D map from a 2D orthographic view. Details of operations performed by mapping applications when viewing a 3D map from a 2D orthographic view are described in concurrently filed U.S. patent application Ser. No. 13/632,102 , now published as U.S. Publication 2013/0326407,entitled "Problem Reporting in Maps"; and concurrently filed U.S. patent application Ser. No. 13/632,040,now issued as U.S. Pat. 9,269,178, entitled "Virtual Camera for 3D Maps". U.S. patent application Ser. No. 13/632,102, now published as U.S. Publication 2013/0326407 and U.S. patent application Ser. No. 13/632, 040, , now issued as U.S. Pat. No. 9,269,178, are incorporated herein by reference. In some embodiments, the mapping application also provides geospatial information for a 3D map from a 3D perspective view.

Figure 5:
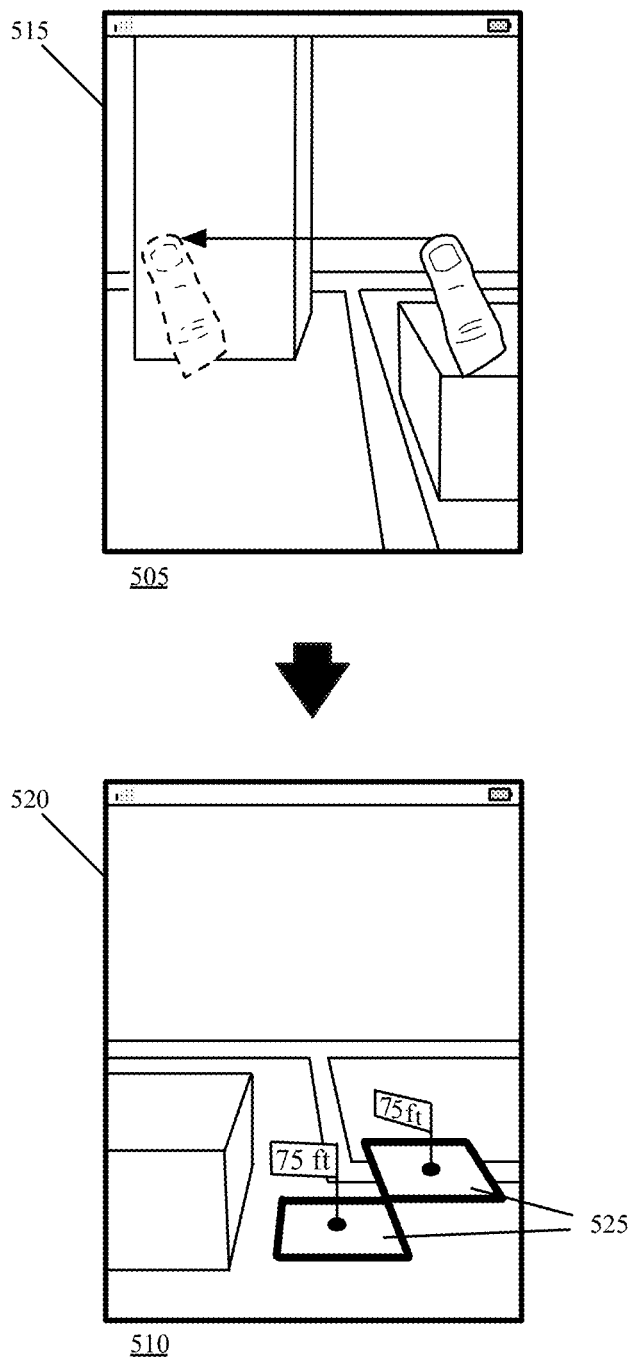
FIG. 5 conceptually illustrates a 3D perspective view of a 3D map that includes geospatial information after a 3D panning operation according to some embodiments of the invention.

FIG. 5 conceptually illustrates a 3D perspective view of a 3D map with geospatial information after a 3D panning operation according to some embodiments of the invention. Specifically, FIG. 5 conceptually illustrates two different stages 505 and 510 of a panning operation while in a 3D perspective view of the 3D map.

The first stage 505 illustrates a 3D perspective view 515 of a 3D map. The 3D view 515 shows two buildings and two streets forming a T-junction. Addition, the first stage 505 shows a signal strength icon in the top right corner that represents the strength of a connection (e.g., measured in decibel-milliwatt (dBm), etc.) between a device on which the mapping application is running and a network (e.g., a cellular network) within which the device is operating. For this example, the device has a weak connection with a network, as indicated by one bar highlighted and the remaining bars of the signal strength icon grayed-out.

The first stage 505 also illustrates a user providing input (e.g., a swipe gesture) to pan the 3D perspective view 515 of the 3D map. In particular, the user is touching a finger on a touchscreen of the device displaying the 3D perspective view 515 and dragging the finger in a left direction. In some embodiments, panning the 3D map (e.g., a defined distance) causes the mapping application to retrieve map tiles to render the new view of the 3D map to which the 3D map is panned. In this example, the view of the 3D map to which the user has panned causes the mapping application to retrieve map tiles for the new view of the 3D map.

The second stage 510 illustrates a 3D perspective view 520 of the 3D map. As shown, the 3D perspective view 515 illustrates the right portion of the 3D perspective view 515 that was moved to the left as a result of the panning operation and a set of geospatial map tiles 525. To render the new portion of the 3D map in the 3D perspective view 520 (i.e. the right portion of the 3D perspective view 520), the mapping application requested map tiles for the new portion of the 3D map. As mentioned above, the device in this example has a weak connection with the network, which prevented the mapping application from retrieving map tiles for the sections of the 3D perspective view 520 at which the set of geospatial map tiles 525 are located. For this example, the mapping application generated and rendered the 3D perspective view 520 with the set of geospatial map tiles 525 to fill in the unavailable map tiles. In addition, the mapping application in this example renders each of the geospatial map tile 525 with a bolding of the border and a 3D callout pointer at or near the center of the map tile. The 3D callout pointer indicates the distance (75 feet in this example) to the nearest available map tile in the 3D perspective view 520. Details of operations performed by the mapping application of some embodiments when viewing a 3D map from a 3D perspective view are described in concurrently filed U.S. patent application Ser. No. 13/632,102, now published as U.S. Publication 2013/0326407. entitled "Problem Reporting in Maps"; and concurrently filed U.S. patent application Ser. No. 13/632,040 now issued as U.S. Pat. No. 9,269,178, entitled "Virtual Camera for 3D Maps".

The FIG. 1-5 described above illustrate operations that cause the mapping application of some embodiments to generate geospatial information for rendering and displaying in a view of a 3D map. One of ordinary skill in the art will understand that other operations might cause the mapping application to present geospatial information in views of the 3D map. Examples include rotate operations, search operations, navigation operations, or any other types of operation that causes the mapping application to load new map tiles.

In addition, FIG. 1-5 show several different presentations of geospatial information. Different embodiments employ additional and/or different presentations of geospatial information in order to provide a user with useful information for quickly determining distances. For instance, any of the FIGS. 1-5 described above may use any of the following presentations of geospatial information in some embodiments.

FIG. 6 conceptually illustrates an example presentation of geospatial information according to some embodiments of the invention. In particular, FIG. 6 conceptually illustrates a single geospatial map tile 600. As shown, the geospatial map tile 600 includes a set of grid lines that represent longitude and latitude coordinates. The horizontal grid lines represent latitude coordinates 30°13'48"N, 30°13'47"N, and 30°13'46"N. The distance between adjacent horizontal grid lines is equivalent to one second of a degree and differs depending on the longitude coordinate value. Additionally, the vertical grid lines represent longitude coordinates 78°44'18" W, 78°44'19"W, and 78°44'20"W. The distance between adjacent vertical grid lines is one second of a degree and depends on the latitude coordinate value.

FIG. 7 conceptually illustrates another example presentation of geospatial information according to some embodiments of the invention. Specially, FIG. 7 conceptually illustrates a single geospatial map tile 700. As illustrated, the geospatial map tile 700 includes a two distance scales that indicate relative distances of 100 feet, 200 feet, and 300 feet. One distance scale is displayed horizontally along the bottom of the geospatial map tile 700 while the other distance scale is displayed vertically along the left side of the geospatial map tile 700.

FIG. 8 conceptually illustrates another example presentation of geospatial information according to some embodiments of the invention. In particular, FIG. 8 conceptually illustrates a single geospatial map tile 800. As shown, the geospatial map tile 800 includes a set of grid lines that represent the closest distance to an available map tile. For this example, the geospatial map tile 800 is surrounded by available map tiles. As such, the distances indicated for the center grid lines is 40 meters, and the distances indicated for the side grid lines is 20 meters.

The FIGS. 6-8 explained above show examples of different presentations of geospatial information in a geospatial map tile. One of ordinary skill in the art will realize that geospatial information may be presented in geospatial map tiles any number of different ways.

Figure 9:
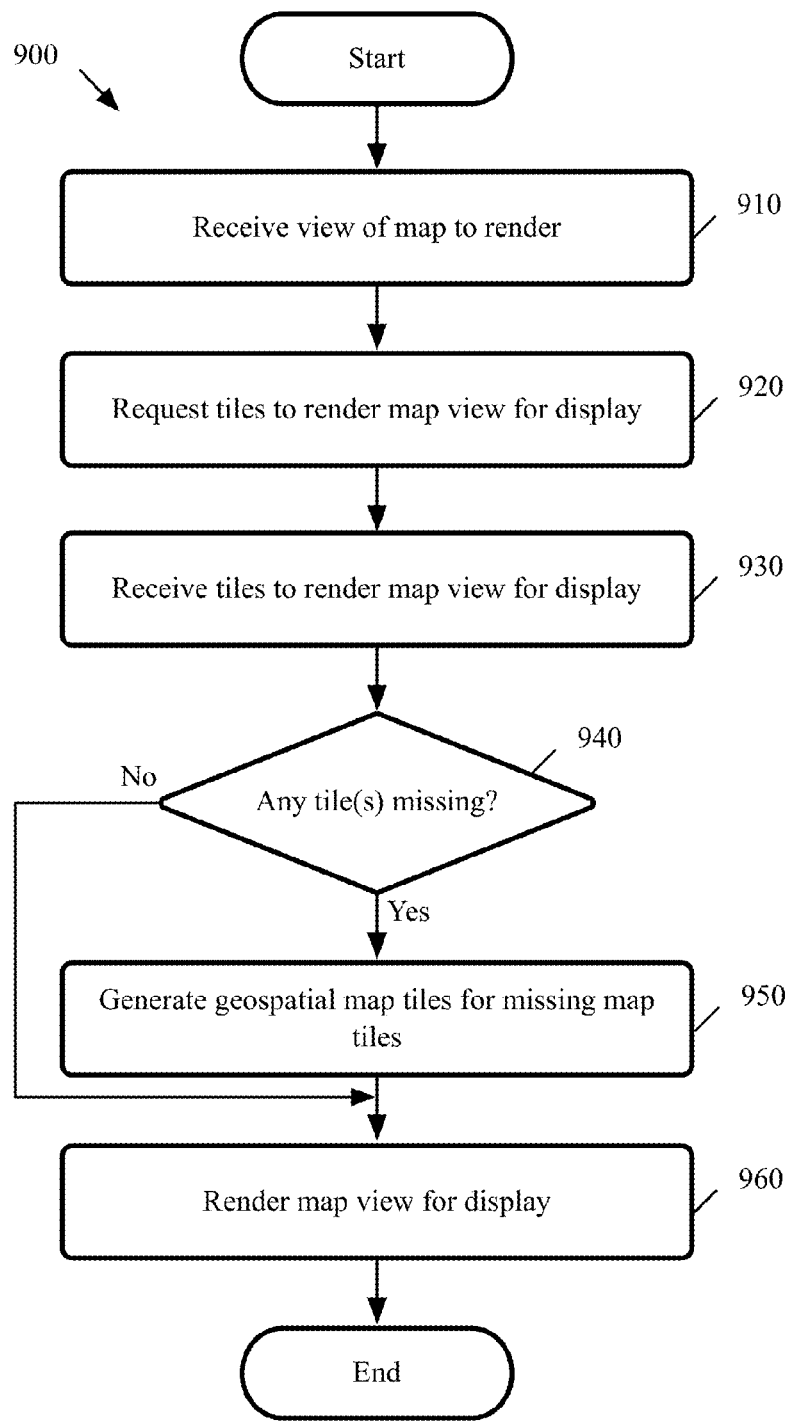
FIG. 9 conceptually illustrates a process of some embodiments for providing geospatial information for unavailable map data.

FIG. 9 conceptually illustrates a process of some embodiments for providing geospatial information for unavailable map data. In some embodiments, the process 900 is performed by a mapping application (e.g., the ones described above by reference to FIGS. 1-5) that operates on a device with a display (e.g., a mobile computing device such as a smart phone or tablet computer) when the mapping application is rendering map views in a map viewing mode (e.g., a location browsing mode, a navigation mode, etc.). As mentioned above, the geospatial information in some embodiments provides spatially meaningful representations in sections of a map view that are not available (e.g., no tiles available, the device cannot download or does not have access to tiles, etc.).

The process 900 starts by receiving (at 910) a view of a map to render. As discussed above, the mapping application of some embodiments requests (e.g., from a virtual camera used to view the map) a map view to render. In some embodiments, the mapping application may request to render the map view in response to a user's input to adjust the current view of the map (e.g., rotate the map, zoom into the map, zoom out from the map, pan the map etc.) while, in some embodiments, the mapping application automatically requests views of the map (e.g., when traversing a navigation route).

Next, the process 900 requests (at 920) from a map service tiles that correspond to the portion of the map from which to render the view of the map for display on the device. In some embodiments, the tiles correspond to grid sections of a map. The process 900 of some embodiments requests map tiles by identifying the portion of the map from which to render the view of the map and requesting such map tiles. In some embodiments, the process 900 requests tiles automatically while the mapping application is in a map viewing mode.

The process 900 then receives (at 930) from the map service the requested map tiles to render the view of the map for display. After receiving the map tiles, the process 900 determines (at 940) whether any requested map tiles are missing from the received map tiles (i.e., map tiles that are unavailable). Tiles may be missing for many reasons, including network interrupts, failure by a data server, if the map view includes areas for which no mapping data is available, the cellular coverage of the area where the device on which the process 900 is executing is located has little or no coverage, etc. If the process 900 determines that no map tiles are missing, then the process 900 proceeds to 960.

When the process 900 determines that there is one or more map tiles missing, the process 900 generates (at 950) geospatial map tiles for the missing map tiles. To generate a geospatial map tile, the process 900 of some embodiments identifies a scale of the view of the map based on a map coordinate system associated with the map that is used for the view of the map or distance information (e.g., metadata) included with the received map tiles. In some embodiments, the scale of the view of the map specifies the actual distances (e.g., real world distances) with respect to the dimensions of the map tiles. The process 900 of different embodiment generates different presentations of geospatial map tiles. For instance, in some embodiments, the process 900 generates any of the geospatial map tiles described above by reference to FIGS. 1-8.

Finally, the process 900 renders (at 960) the view of the map for display on the device. When geospatial map tiles have been generated for unavailable map tiles, the process 900 renders the view of the map that includes the available map tiles and the geospatial map tiles. When the process 900 receives all the requested map tiles, the process 900 simply renders the view of the map using the requested map tiles.

II. Image Processing Pipeline

Figure 10:
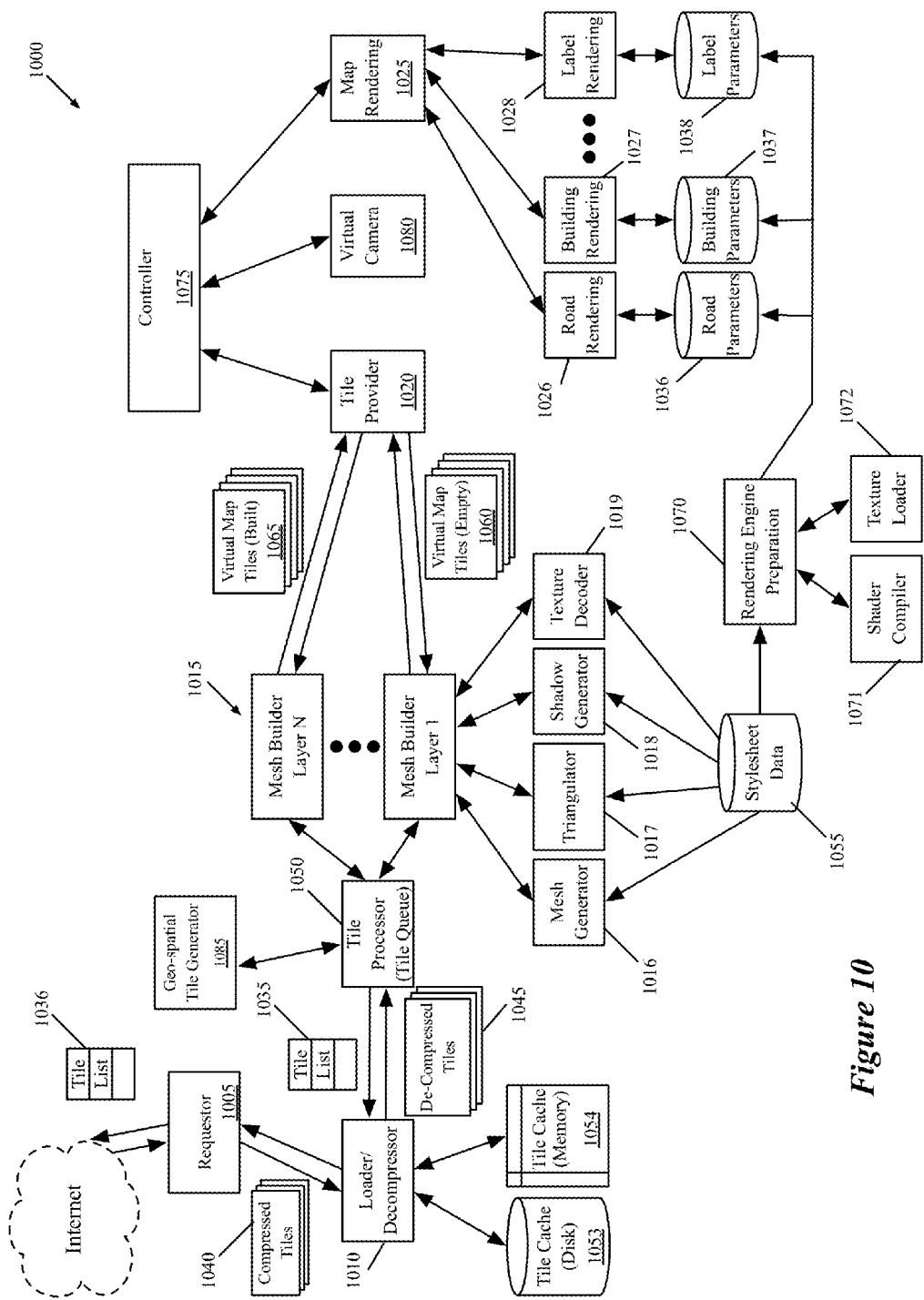
FIG. 10 conceptually illustrates a processing pipeline performed by the mapping application of some embodiments in order to render a map for display at the client device.

FIG. 10 conceptually illustrates a processing pipeline 1000 performed by the mapping application of some embodiments in order to render a map for display at the client device (e.g., on the display of the client device). As illustrated, the processing pipeline 1000 includes a requestor 1005, a loader/decompressor 1010, a tile processor 1050, a geospatial tile generator 1085, a set of mesh builders 1015, a tile provider 1020, a virtual camera 1023, and a map rendering engine 1025.

The tile processor 1050 of some embodiments receives requests for map tiles from the mesh builders 1015 and performs a multiplexing operation before forwarding the requests. The mesh builders 1015, as will be described below, identify existing map tiles (that are stored on a mapping service server or in a cache on the device performing the processing pipeline 1000) needed to build their respective meshes. In some embodiments, the map tiles are referenced as nodes of a quadtree. The tile processor acts as a multiplexer when multiple mesh builders request the same tile. As the mesh builders request tiles, in some embodiments the tile processor 1050 stores these tiles in its queue. After either a particular period of time or after a particular number of tiles have been requested, the tile processor 1050 flushes the queue and sends the tile list to the loader/decompressor 1010.

In some instances, some of the requested map tiles may not be available (e.g., a user of the mapping application travels underground, through an area without cellular coverage, etc.) and, thus, the tile processor 1050 cannot complete the mesh builders 1015' requests. In some embodiments, the tile processor 1050 sends a set of the available map tiles to the geospatial tile generator 1085 and requests the geospatial tile generator 1085 to generate map tiles to use in place of the unavailable map tiles.

The geospatial tile generator 1085 receives requests from the tile processor 1050 to generate map tiles. When the geospatial tile generator 1085 receives such requests along with a set of available tiles (that are part of the tiles requested by the mesh builders 1015), the geospatial tile generator 1085 uses the data contained in the set of available tiles to generate geospatial map tiles for the unavailable map tiles. Once the requested map tiles have been generated, the geospatial tile generator 1085 returns them to the tile processor 1050.

The loader/decompressor 1010 receives the multiplexed tile list 1035 from the tile processor 1050 and handles the return of decompressed tiles 1045 to the tile processor 1050. In some embodiments, the loader/decompressor 1010 first checks one or more caches to determine whether it has the requested tiles stored at the device on which the mapping application operates. As shown, some embodiments include both a first tile cache 1053 stored on non-volatile memory (e.g., disk, flash memory, etc.) as well as a second tile cache 1054 stored in volatile memory (e.g., random access memory). When the loader/decompressor 1010 finds the tiles in one of the caches 1053 and 1054, it sends these tiles back to the tile processor 1050 (for return to the requesting mesh builder(s) 1015.

When the loader/decompressor 1010 does not have the tiles in its cache, it sends a request to the requestor 1005 for the remaining tiles. Upon receiving these map tiles 1040 in a compressed format, the loader/decompressor decompresses the received tiles to generate decompressed tiles 1045. In some embodiments, after generating the map tiles as described above, the mapping service also compresses the tiles using an encoding technique. Different embodiments use different encoding techniques. The loader/decompressor 1010 returns these decompressed tiles 1045 to the tile processor 1050, and in some cases also stores them in one or both of the tile caches 1053 and 1054.

The requestor 1005, in some embodiments, receives requests for map tiles from the loader/decompressor 1010 (which in turn receives the requests from the tile processor 1050). These map tiles, in some embodiments, are stored on a server (e.g., a server of the mapping service to which the user's device connects). The requestor sends a tile list 1036 (received from the loader/decompressor 1010) that identifies the tiles needed from the mapping service (and not available in the tile caches 1053 and 1054. In some embodiments, the requestor takes advantage of the operating device's network connections (e.g., a Wi-Fi connection, a GSM connection, etc.) to contact the mapping service through the Internet to retrieve the needed map tiles. Upon receiving the tiles (in a compressed form) from the mapping service, the requestor 1005 returns the compressed tiles 1040 to the loader/decompressor.

In some embodiments, the requestor 1005 (or the tile processor 1050, or a different portion of the pipeline) identifies tiles at additional zoom levels that cover the same geographical area as the initially requested tiles, and adds these tiles to the request list 1036 so that the tiles will be available if needed in the near future. In addition, some embodiments automatically request tiles at the same (or different zoom levels) for nearby geographical regions, in order to have the tiles available in case the user pans the map. In some embodiments, the requestor 1005, loader/decompressor 1010, and tile processor 1050 function as an independent portion of the processing pipeline, with the mesh builders 1015 as the "clients" of this section.

The mesh builders 1015 (also referred to as tile sources) of some embodiments are instantiated by the tile provider 1020 in order to build different layers of virtual map tiles. Depending on the type of map being displayed by the mapping application, the tile provider 1020 may instantiate a different number and different types of mesh builders 1015. For instance, for a satellite view map, the tile provider 1020 might only instantiate one mesh builder 1015, as the satellite image does not contain multiple layers of data. However, in some embodiments, additional mesh builders may be instantiated for generating the different labels to overlay on the satellite images. For a 2D or 3D rendered vector map (i.e., a non-satellite image map), some embodiments instantiate separate mesh builders 1015 to build meshes for landcover polygon data (e.g., parks, bodies of water, etc.), roads, place of interest markers, point labels (e.g., labels for parks, etc.), road labels, traffic (if displaying traffic), buildings, raster data (for certain objects at certain zoom levels), as well as other layers of data to incorporate into the map.

The mesh builders 1015 of some embodiments, receive "empty" virtual map tiles 1060 from the tile provider 1020 and return "built" virtual map tiles 1065 to the tile provider 1020. That is, the tile provider 1020 sends to each of the mesh builders 1015 one or more virtual map tiles 1060. Each of the virtual map tiles 1060 indicates an area of the world for which to draw a mesh. Upon receiving such a virtual map tile 1060, a mesh builder 1015 identifies the map tiles needed from the mapping service, and sends its list to the tile processor 1050.

Upon receiving the tiles back from tile processor 1050, the mesh builder uses vector data stored in the tiles to build a polygon mesh for the area described by the virtual map tile. In some embodiments, the mesh builder 1015 uses several different functions to build the mesh. These functions include the mesh generator 1016, the triangulator 1017, the shadow generator 1018, and the texture decoder 1019. In some embodiments, these functions (and additional mesh building functions) are available to each mesh builder, with different mesh builders 1015 using different functions. For instance, the mesh builder responsible for the buildings layer may use a mesh generator 1016 and a triangulator 1017. In addition, several different types of shadow generators may be available to the mesh builder 1015, including a first shadow generator for creating dynamic shadows (that change as the map rotates) and a second shadow generator for creating a raster image drop shadow.

The mesh generator 1016 generates a mesh of vertices using the tile vector data, in some embodiments. The triangulator 1017 generates triangles from the mesh, to simplify the eventual rendering. The shadow generator 1018 adds shadows to the mesh (e.g., by labeling vertices and/or polygons with values indicating to the renderer to draw a shadow, or how dark of a shadow to draw. The texture decoder 1019 decodes texture information (e.g., from a stylesheet) and applies the texture information to the mesh. In different embodiments, the texture information may indicate colors, patterns, etc. to add to the polygons when rendered, which is encoded into the mesh.

In some embodiments, the texture information may be determined based on stylesheet data 1055. Furthermore, some embodiments also use this stylesheet data 1055 to determine the shadow, triangulation, and or mesh construction data. Using stylesheet-driven rendering enables simple modification to many aspects of the map output, because changes to a texture, color, etc. can be made through a minor modification of a stylesheet. As a result, textures can be dynamically created on the fly. An example benefit of the stylesheet-driven rendering is the facilitation of using different textures for certain types of objects at different zoom levels or geographic regions. For instance, when viewed at a low zoom level (less detail), some embodiments might color a park a simple light green. On the other hand, as the user zooms in to a higher zoom level (more detail), the stylesheets indicate to apply a pattern (e.g., a foliage pattern) to the park region. Similarly, patterns at higher zoom levels could be added to buildings, bodies of water, asphalt, urban land cover, etc. This information can be coded into a stylesheet and then the mesh builder simply adds the appropriate texture information to a tile mesh based on the zoom level of the tile.

By tagging roads (e.g., as urban, suburban, or rural), the mapping service can induce the client application to use different textures for the land cover regions around those roads. In addition, land cover region tags can be updated by the server based on metrics indicative of the sort of area covered by the land cover region. For instance, some embodiments (on the mapping service end) determine the density of mobile devices within the region (e.g., based on the number of devices accessing the mapping service) and generate tags for the land cover. The stylesheets stored by the client devices (which may be updated from the mapping service, in some embodiments) then indicate how to draw these land cover regions. Similarly, different styles can be used for rendering aspects of different regions (e.g., desert, forest, rocky, etc. for land cover; different colors for labels in different states; or other such distinctions).

Each mesh builder 1015 returns its virtual map tiles 1065 to the tile provider 1020 with its layer of the mesh filled in. The tile provider 1020 receives from the controller 1075 a particular view (i.e., a volume, or viewing frustum) that represents the map view to be displayed (i.e., the volume visible from the virtual camera 1080). The tile provider performs any culling (e.g., removing surface area too far away, removing objects that will be entirely behind other objects, etc.) in some embodiments, then sends the virtual map tiles 1060 to the mesh builders 1015.

In some embodiments, the tile provider 1020 receives the built virtual map tiles 1065 from the different mesh builders at different times (e.g., due to different processing times to complete more and less complicated meshes, different time elapsed before receiving the necessary map tiles from the tile processor 1050, etc.). Once all of the layers of virtual map tiles have been returned, the tile provider 1020 of some embodiments puts the layers together and releases the data to the controller 1075 for rendering.

In some embodiments, the tile provider 1020 may have already received a new camera volume for which to build a mesh before the mesh builders have returned their data. For instance, when the user quickly pans or zooms a map, the data returned by the mesh builders may be out of date. In some embodiments, the tile provider either drops the built virtual map tile layers or stores them in memory. Whether to drop the built virtual map tiles depends, in different embodiments, on whether it is likely the built tiles will be needed soon (e.g., how much the user has moved the virtual camera, whether a navigation is running that makes it unlikely the application will display the older data) and the amount of memory currently in use.

The virtual camera 1080 generates a volume or surface for the pipeline 1000 to render, and sends this information to the controller 1075. Based on a particular location and orientation from which the map will be rendered (i.e., the point in 3D space from which the user "views" the map), the virtual camera identifies a field of view to actually send to the tile provider 1020. In some embodiments, when the mapping application is rendering the 3D perspective view for navigation, the field of view of the virtual camera is determined according to an algorithm that generates a new virtual camera location and orientation at regular intervals based on the movement of the user device.

The controller 1075 is responsible for managing the tile provider 1020, virtual camera 1080, and map rendering engine 1025 in some embodiments. In some embodiments, multiple tile providers may actually be instantiated, and the controller puts together several virtual map tiles (e.g., map tiles and building tiles) to create a scene that is handed off to the map rendering engine 1025.

The map rendering engine 1025 is responsible for generating a drawing to output to a display device based on the mesh tiles 1065 sent from the virtual camera. As shown, the map rendering engine 1025 of some embodiments has several sub-processes. In some embodiments, each different element is rendered by a different sub-process, with the rendering engine 1025 handling the occlusion of different layers of objects (e.g., placing labels above or behind different buildings, generating roads on top of land cover, etc. This figure illustrates a road rendering process 1026, a building rendering process 1027, and a label rendering process 1028. Examples of additional processes include a vegetation rendering process, a raster traffic rendering process, a raster road rendering process, a satellite rendering process, a polygon rendering process, a background raster rendering process, etc.

Each of the rendering processes includes a set of rendering parameters; illustrated are road parameters 1036, building parameters 1037, and label parameters 1038. In some embodiments, this data includes information on how to render the roads (e.g., shader information, textures to use for different types of roads, etc.).

In some embodiments, these sets of rendering parameters are generated at least in part by a rendering engine preparation operation 1070. The rendering engine preparation operation 1070 includes a shader compiler 1071 and a texture loader 1072, among other operations. The shader compiler 1071 compiles shaders that the rendering engine will use, and the texture loader 1072 loads texture information (e.g., into the rendering parameters). This texture information may come from the stylesheet data 1055 in some embodiments.

The operation of the rendering pipeline 1000 in some embodiments will now be described. Based on user input to view a particular map region at a particular zoom level, the virtual camera 1080 specifies a location and orientation from which to view the map region, and sends this viewing frustum, or volume, to the controller 1075. The controller 1075 instantiates one or more tile providers. While one tile provider 1020 is shown in this figure, some embodiments allow the instantiation of multiple tile providers at once. For instance, some embodiments instantiate separate tile providers for building tiles and for map tiles.

The tile provider 1020 performs any culling necessary to generate an empty virtual map tile identifying regions of the map region for which a mesh needs to be built, and sends the empty virtual map tiles 1060 to the mesh builders 1015, which are instantiated for the different layers of the drawn map (e.g., roads, land cover, POI labels, etc.). The mesh builders 1015 use a manifest received from the mapping service that identifies the different tiles available on the mapping service server (i.e., as nodes of a quadtree). The mesh builders 1015 request specific map tiles from the tile processor 1050, which removes any duplicate requests and sends a tile list 1035 to the loader/decompressor 1010.

The loader/decompressor 1010 determines whether the requested tiles are stored in the tile caches (either the non-volatile storage cache 1053 or the volatile storage cache 1054), and returns any such tiles to the tile processor 1050 for distribution to the requesting mesh builders 1015. For any tiles not already stored locally, the loader/decompressor 1010 sends a request to the requestor 1005, which sends tile list 1036 (a pared-down version of tile list 1035) to a remote mapping service server. The requestor 1005 receives from the mapping service, and forwards to the loader/decompressor 1010, the requested map tiles in compressed form 1040. The loader/decompressor 1010 decompresses (e.g., decodes) these tiles, stores them in its cache(s), and sends the decompressed tiles 1045 to the tile processor 1050 for return to the mesh builders 1015.

When some of the tiles requested by the mesh builders 1015 are not available, the tile processor 1050 sends the geospatial tile generator 1085 (1) a request to generate geospatial map tiles for the unavailable map tiles and (2) a set of available tiles. The geospatial tile generator 1085 uses the data contained in the set of available tiles to generate geospatial map tiles for the unavailable map tiles and then returns the generated tiles to the tile processor 1050.

Once a particular mesh builder 1015 has received its map tiles, it begins using the vector data stored in the map tiles to build the mesh for the virtual map tiles sent from the tile provider 1020. After building the mesh for its map layer, the mesh builder 1015 sends the built virtual map tile 1065 back to the tile provider 1020. The tile provider 1020 waits until it has received all of the virtual map tiles from the various mesh builders 1015, then layers these together and sends the completed virtual map tile to the controller 1075. The controller stitches together the returned tiles from all of its tile providers (e.g., a virtual map tile and a virtual building tile) and sends this scene to the rendering engine 1025. The map rendering engine 1025 uses the information in the map tiles to draw the scene for display.

The processing pipeline of some embodiments is further described in concurrently filed U.S. patent application Ser. No. 13/632,035, now issued as U.S. Pat. No. 9,111,380, entitled "Rendering Maps". U.S. patent application Ser. No. 13/632,035, now issued as U.S. Pat. No. 9,111,380, is incorporated herein by reference.

III. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

A. Mobile Device

Figure 11:
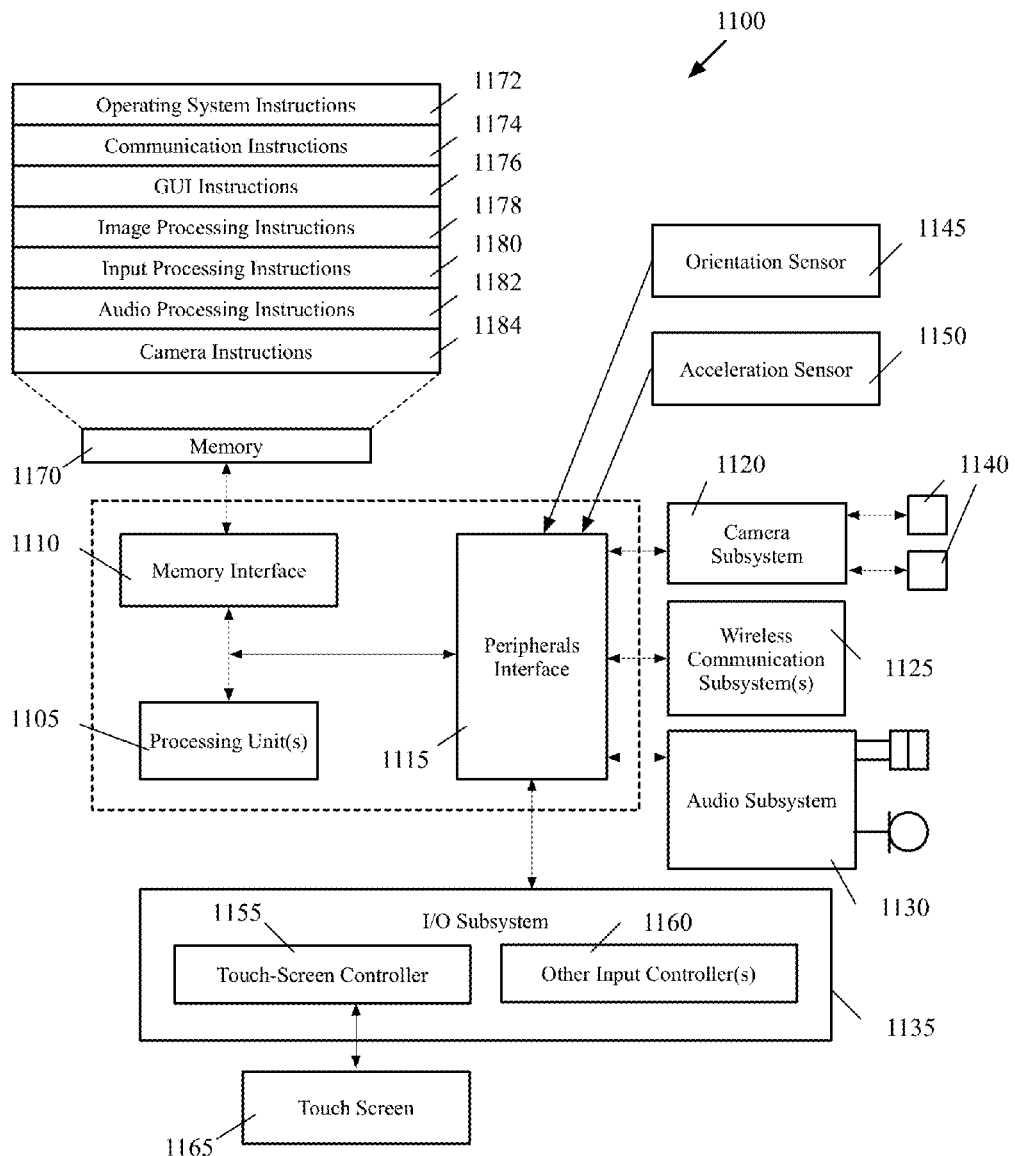
FIG. 11 conceptually illustrates an example of an architecture of a mobile computing device of some embodiments.

The mapping and navigation applications of some embodiments operate on mobile devices, such as smart phones (e.g., iPhones®) and tablets (e.g., iPads®). FIG. 11 is an example of an architecture 1100 of such a mobile computing device. Examples of mobile computing devices include smartphones, tablets, laptops, etc. As shown, the mobile computing device 1100 includes one or more processing units 1105, a memory interface 1110 and a peripherals interface 1115.

The peripherals interface 1115 is coupled to various sensors and subsystems, including a camera subsystem 1120, a wireless communication subsystem(s) 1125, an audio subsystem 1130, an I/O subsystem 1135, etc. The peripherals interface 1115 enables communication between the processing units 1105 and various peripherals. For example, an orientation sensor 1145 (e.g., a gyroscope) and an acceleration sensor 1150 (e.g., an accelerometer) are coupled to the peripherals interface 1115 to facilitate orientation and acceleration functions.

The camera subsystem 1120 is coupled to one or more optical sensors 1140 (e.g., a charged coupled device (CCD) optical sensor, a complementary metal-oxide-semiconductor (CMOS) optical sensor, etc.). The camera subsystem 1120 coupled with the optical sensors 1140 facilitates camera functions, such as image and/or video data capturing. The wireless communication subsystem 1125 serves to facilitate communication functions. In some embodiments, the wireless communication subsystem 1125 includes radio frequency receivers and transmitters, and optical receivers and transmitters (not shown in FIG. 11). These receivers and transmitters of some embodiments are implemented to operate over one or more communication networks such as a GSM network, a Wi-Fi network, a Bluetooth network, etc. The audio subsystem 1130 is coupled to a speaker to output audio (e.g., to output voice navigation instructions). Additionally, the audio subsystem 1130 is coupled to a microphone to facilitate voice-enabled functions, such as voice recognition (e.g., for searching), digital recording, etc.

The I/O subsystem 1135 involves the transfer between input/output peripheral devices, such as a display, a touch screen, etc., and the data bus of the processing units 1105 through the peripherals interface 1115. The I/O subsystem 1135 includes a touch-screen controller 1155 and other input controllers 1160 to facilitate the transfer between input/output peripheral devices and the data bus of the processing units 1105. As shown, the touch-screen controller 1155 is coupled to a touch screen 1165. The touch-screen controller 1155 detects contact and movement on the touch screen 1165 using any of multiple touch sensitivity technologies. The other input controllers 1160 are coupled to other input/control devices, such as one or more buttons. Some embodiments include a near-touch sensitive screen and a corresponding controller that can detect near-touch interactions instead of or in addition to touch interactions.

The memory interface 1110 is coupled to memory 1170. In some embodiments, the memory 1170 includes volatile memory (e.g., high-speed random access memory), non-volatile memory (e.g., flash memory), a combination of volatile and non-volatile memory, and/or any other type of memory. As illustrated in FIG. 11, the memory 1170 stores an operating system (OS) 1172. The OS 1172 includes instructions for handling basic system services and for performing hardware dependent tasks.

The memory 1170 also includes communication instructions 1174 to facilitate communicating with one or more additional devices; graphical user interface instructions 1176 to facilitate graphic user interface processing; image processing instructions 1178 to facilitate image-related processing and functions; input processing instructions 1180 to facilitate input-related (e.g., touch input) processes and functions; audio processing instructions 1182 to facilitate audio-related processes and functions; and camera instructions 1184 to facilitate camera-related processes and functions. The instructions described above are merely exemplary and the memory 1170 includes additional and/or other instructions in some embodiments. For instance, the memory for a smartphone may include phone instructions to facilitate phone-related processes and functions. Additionally, the memory may include instructions for a mapping and navigation application as well as other applications. The above-identified instructions need not be implemented as separate software programs or modules. Various functions of the mobile computing device can be implemented in hardware and/or in software, including in one or more signal processing and/or application specific integrated circuits.

While the components illustrated in FIG. 11 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 11 may be split into two or more integrated circuits.

B. Computer System

Figure 12:
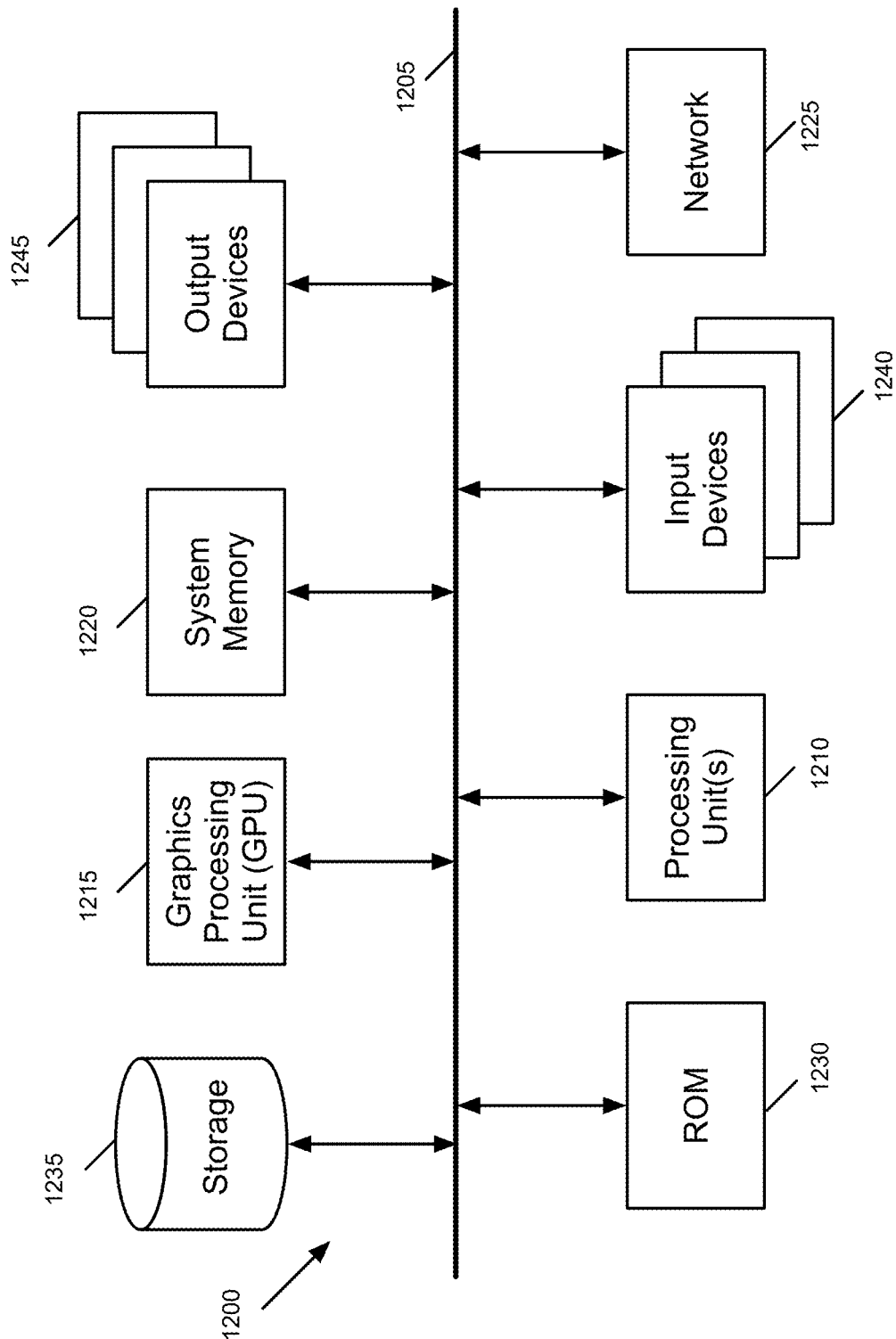
FIG. 12 conceptually illustrates an example of an electronic system with which some embodiments of the invention are implemented.

FIG. 12 conceptually illustrates another example of an electronic system 1200 with which some embodiments of the invention are implemented. The electronic system 1200 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 1200 includes a bus 1205, processing unit(s) 1210, a graphics processing unit (GPU) 1215, a system memory 1220, a network 1225, a read-only memory 1230, a permanent storage device 1235, input devices 1240, and output devices 1245.

The bus 1205 collectively represents all system, peripheral, and chipset buses that communicatively connect the numerous internal devices of the electronic system 1200. For instance, the bus 1205 communicatively connects the processing unit(s) 1210 with the read-only memory 1230, the GPU 1215, the system memory 1220, and the permanent storage device 1235.

From these various memory units, the processing unit(s) 1210 retrieves instructions to execute and data to process in order to execute the processes of the invention. The processing unit(s) may be a single processor or a multi-core processor in different embodiments. Some instructions are passed to and executed by the GPU 1215. The GPU 1215 can offload various computations or complement the image processing provided by the processing unit(s) 1210. In some embodiments, such functionality can be provided using CoreImage's kernel shading language.

The read-only-memory (ROM) 1230 stores static data and instructions that are needed by the processing unit(s) 1210 and other modules of the electronic system. The permanent storage device 1235, on the other hand, is a read-and-write memory device. This device is a non-volatile memory unit that stores instructions and data even when the electronic system 1200 is off. Some embodiments of the invention use a mass-storage device (such as a magnetic or optical disk and its corresponding disk drive, integrated flash memory) as the permanent storage device 1235.

Other embodiments use a removable storage device (such as a floppy disk, flash memory device, etc., and its corresponding drive) as the permanent storage device. Like the permanent storage device 1235, the system memory 1220 is a read-and-write memory device. However, unlike storage device 1235, the system memory 1220 is a volatile read-and-write memory, such a random access memory. The system memory 1220 stores some of the instructions and data that the processor needs at runtime. In some embodiments, the invention's processes are stored in the system memory 1220, the permanent storage device 1235, and/or the read-only memory 1230. From these various memory units, the processing unit(s) 1210 retrieves instructions to execute and data to process in order to execute the processes of some embodiments.

The bus 1205 also connects to the input and output devices 1240 and 1245. The input devices 1240 enable the user to communicate information and select commands to the electronic system. The input devices 1240 include alphanumeric keyboards and pointing devices (also called "cursor control devices"), cameras (e.g., webcams), microphones or similar devices for receiving voice commands, etc. The output devices 1245 display images generated by the electronic system or otherwise output data. The output devices 1245 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 12, bus 1205 also couples electronic system 1200 to a network 1225 through a network adapter (not shown). In this manner, the computer can be a part of a network of computers (such as a local area network ("LAN"), a wide area network ("WAN"), or an Intranet, or a network of networks, such as the Internet. Any or all components of electronic system 1200 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

IV. Map Service Environment

Figure 13:
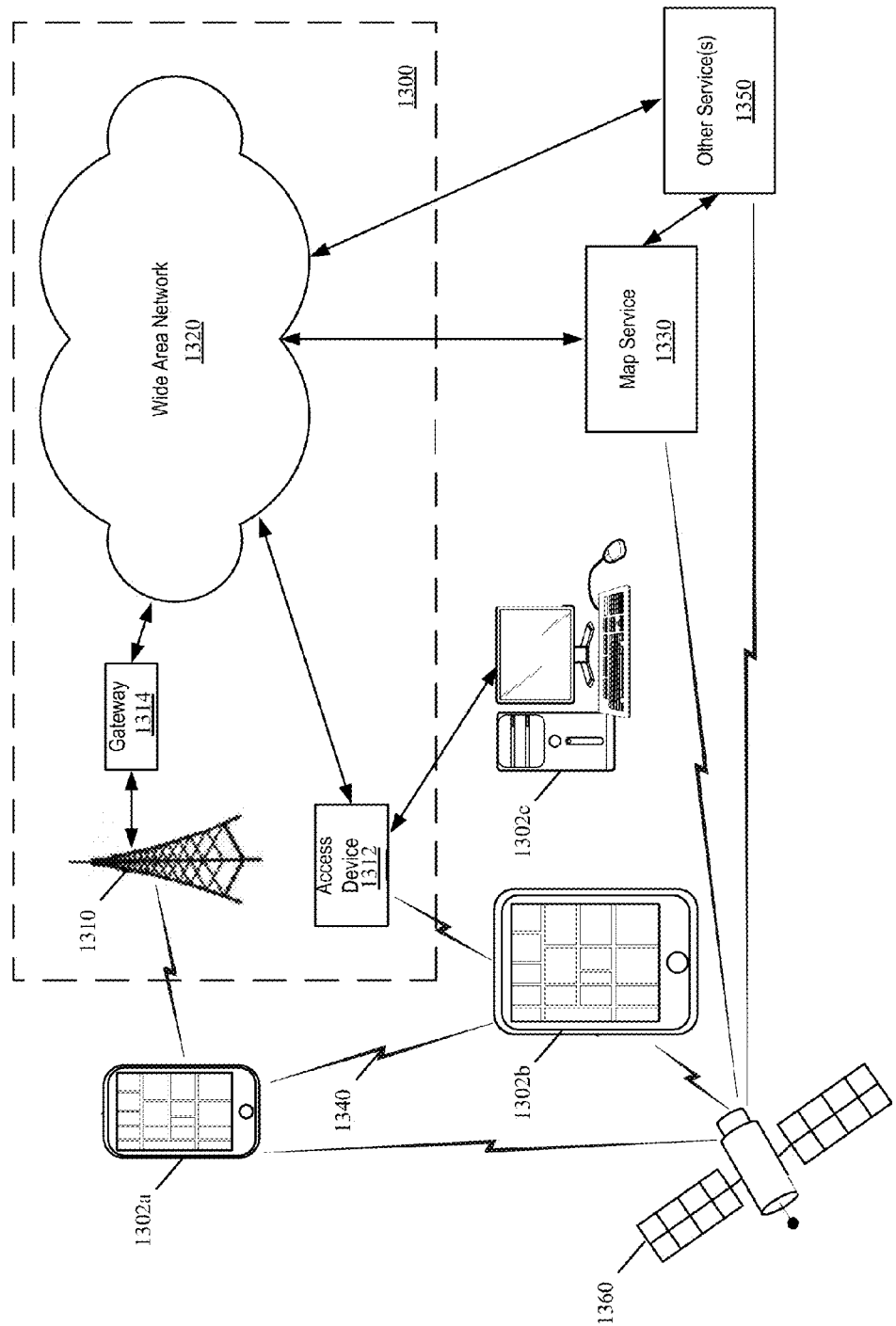
FIG. 13 conceptually illustrates an electronic device with which some embodiments of the invention are implemented.

Various embodiments may operate within a map service operating environment. FIG. 13 illustrates a map service operating environment, according to some embodiments. A map service 1330 (also referred to as mapping service) may provide map services for one or more client devices 1302a-1302c in communication with the map service 1330 through various communication methods and protocols. A map service 1330 in some embodiments provides map information and other map-related data, such as two-dimensional map image data (e.g., aerial view of roads utilizing satellite imagery), three-dimensional map image data (e.g., traversable map with three-dimensional features, such as buildings), route and direction calculation (e.g., ferry route calculations or directions between two points for a pedestrian), real-time navigation data (e.g., turn-by-turn visual navigation data in two or three dimensions), location data (e.g., where is the client device currently located), and other geographic data (e.g., wireless network coverage, weather, traffic information, or nearby points-of-interest). In various embodiments, the map service data may include localized labels for different countries or regions; localized labels may be utilized to present map labels (e.g., street names, city names, points of interest) in different languages on client devices. Client devices 1302a-1302c may utilize these map services by obtaining map service data. Client devices 1302a-1302c may implement various techniques to process map service data. Client devices 1302a-1302c may then provide map services to various entities, including, but not limited to, users, internal software or hardware modules, and/or other systems or devices external to the client devices 1302a-1302c.

In some embodiments, a map service is implemented by one or more nodes in a distributed computing system. Each node may be assigned one or more services or components of a map service. Some nodes may be assigned the same map service or component of a map service. A load balancing node in some embodiments distributes access or requests to other nodes within a map service. In some embodiments a map service is implemented as a single system, such as a single server. Different modules or hardware devices within a server may implement one or more of the various services provided by a map service.

A map service in some embodiments provides map services by generating map service data in various formats. In some embodiments, one format of map service data is map image data. Map image data provides image data to a client device so that the client device may process the image data (e.g., rendering and/or displaying the image data as a two-dimensional or three-dimensional map). Map image data, whether in two or three dimensions, may specify one or more map tiles. A map tile may be a portion of a larger map image. Assembling together the map tiles of a map produces the original map. Tiles may be generated from map image data, routing or navigation data, or any other map service data. In some embodiments map tiles are raster-based map tiles, with tile sizes ranging from any size both larger and smaller than a commonly-used 256 pixel by 256 pixel tile. Raster-based map tiles may be encoded in any number of standard digital image representations including, but not limited to, Bitmap (.bmp), Graphics Interchange Format (.gif), Joint Photographic Experts Group (.jpg, .jpeg, etc.), Portable Networks Graphic (.png), or Tagged Image File Format (.tiff). In some embodiments, map tiles are vector-based map tiles, encoded using vector graphics, including, but not limited to, Scalable Vector Graphics (.svg) or a Drawing File (.drw). Some embodiments also include tiles with a combination of vector and raster data. Metadata or other information pertaining to the map tile may also be included within or along with a map tile, providing further map service data to a client device. In various embodiments, a map tile is encoded for transport utilizing various standards and/or protocols.

In various embodiments, map tiles may be constructed from image data of different resolutions depending on zoom level. For instance, for low zoom level (e.g., world or globe view), the resolution of map or image data need not be as high relative to the resolution at a high zoom level (e.g., city or street level). For example, when in a globe view, there may be no need to render street level artifacts as such objects would be so small as to be negligible in many cases.

A map service in some embodiments performs various techniques to analyze a map tile before encoding the tile for transport. This analysis may optimize map service performance for both client devices and a map service. In some embodiments map tiles are analyzed for complexity, according to vector-based graphic techniques, and constructed utilizing complex and non-complex layers. Map tiles may also be analyzed for common image data or patterns that may be rendered as image textures and constructed by relying on image masks. In some embodiments, raster-based image data in a map tile contains certain mask values, which are associated with one or more textures. Some embodiments also analyze map tiles for specified features that may be associated with certain map styles that contain style identifiers.

Other map services generate map service data relying upon various data formats separate from a map tile in some embodiments. For instance, map services that provide location data may utilize data formats conforming to location service protocols, such as, but not limited to, Radio Resource Location services Protocol (RRLP), TIA 801 for Code Division Multiple Access (CDMA), Radio Resource Control (RRC) position protocol, or LTE Positioning Protocol (LPP). Embodiments may also receive or request data from client devices identifying device capabilities or attributes (e.g., hardware specifications or operating system version) or communication capabilities (e.g., device communication bandwidth as determined by wireless signal strength or wire or wireless network type).

A map service may obtain map service data from internal or external sources. For example, satellite imagery used in map image data may be obtained from external services, or internal systems, storage devices, or nodes. Other examples may include, but are not limited to, GPS assistance servers, wireless network coverage databases, business or personal directories, weather data, government information (e.g., construction updates or road name changes), or traffic reports. Some embodiments of a map service may update map service data (e.g., wireless network coverage) for analyzing future requests from client devices.

Various embodiments of a map service may respond to client device requests for map services. These requests may be a request for a specific map or portion of a map. Some embodiments format requests for a map as requests for certain map tiles. In some embodiments, requests also supply the map service with starting locations (or current locations) and destination locations for a route calculation. A client device may also request map service rendering information, such as map textures or style sheets. In at least some embodiments, requests are also one of a series of requests implementing turn-by-turn navigation. Requests for other geographic data may include, but are not limited to, current location, wireless network coverage, weather, traffic information, or nearby points-of-interest.

A map service, in some embodiments, analyzes client device requests to optimize a device or map service operation. For instance, a map service may recognize that the location of a client device is in an area of poor communications (e.g., weak wireless signal) and send more map service data to supply a client device in the event of loss in communication or send instructions to utilize different client hardware (e.g., orientation sensors) or software (e.g., utilize wireless location services or Wi-Fi positioning instead of GPS-based services). In another example, a map service may analyze a client device request for vector-based map image data and determine that raster-based map data better optimizes the map image data according to the image's complexity. Embodiments of other map services may perform similar analysis on client device requests and as such the above examples are not intended to be limiting.

Various embodiments of client devices (e.g., client devices 1302a-1302c) are implemented on different portable-multifunction device types. Client devices 1302a-1302c utilize map service 1330 through various communication methods and protocols. In some embodiments, client devices 1302a-1302c obtain map service data from map service 1330. Client devices 1302a-1302c request or receive map service data. Client devices 1302a-1302c then process map service data (e.g., render and/or display the data) and may send the data to another software or hardware module on the device or to an external device or system.

A client device, according to some embodiments, implements techniques to render and/or display maps. These maps may be requested or received in various formats, such as map tiles described above. A client device may render a map in two-dimensional or three-dimensional views. Some embodiments of a client device display a rendered map and allow a user, system, or device providing input to manipulate a virtual camera in the map, changing the map display according to the virtual camera's position, orientation, and field-of-view. Various forms and input devices are implemented to manipulate a virtual camera. In some embodiments, touch input, through certain single or combination gestures (e.g., touch-and-hold or a swipe) manipulates the virtual camera. Other embodiments allow manipulation of the device's physical location to manipulate a virtual camera. For instance, a client device may be tilted up from its current position to manipulate the virtual camera to rotate up. In another example, a client device may be tilted forward from its current position to move the virtual camera forward. Other input devices to the client device may be implemented including, but not limited to, auditory input (e.g., spoken words), a physical keyboard, mouse, and/or a joystick.

Some embodiments provide various visual feedback to virtual camera manipulations, such as displaying an animation of possible virtual camera manipulations when transitioning from two-dimensional map views to three-dimensional map views. Some embodiments also allow input to select a map feature or object (e.g., a building) and highlight the object, producing a blur effect that maintains the virtual camera's perception of three-dimensional space.

In some embodiments, a client device implements a navigation system (e.g., turn-by-turn navigation). A navigation system provides directions or route information, which may be displayed to a user. Some embodiments of a client device request directions or a route calculation from a map service. A client device may receive map image data and route data from a map service. In some embodiments, a client device implements a turn-by-turn navigation system, which provides real-time route and direction information based upon location information and route information received from a map service and/or other location system, such as Global Positioning Satellite (GPS). A client device may display map image data that reflects the current location of the client device and update the map image data in real-time. A navigation system may provide auditory or visual directions to follow a certain route.

A virtual camera is implemented to manipulate navigation map data according to some embodiments. Some embodiments of client devices allow the device to adjust the virtual camera display orientation to bias toward the route destination. Some embodiments also allow virtual camera to navigation turns simulating the inertial motion of the virtual camera.

Client devices implement various techniques to utilize map service data from map service. Some embodiments implement some techniques to optimize rendering of two-dimensional and three-dimensional map image data. In some embodiments, a client device locally stores rendering information. For instance, a client stores a style sheet which provides rendering directions for image data containing style identifiers. In another example, common image textures may be stored to decrease the amount of map image data transferred from a map service. Client devices in different embodiments implement various modeling techniques to render two-dimensional and three-dimensional map image data, examples of which include, but are not limited to: generating three-dimensional buildings out of two-dimensional building footprint data; modeling two-dimensional and three-dimensional map objects to determine the client device communication environment; generating models to determine whether map labels are seen from a certain virtual camera position; and generating models to smooth transitions between map image data. Some embodiments of client devices also order or prioritize map service data in certain techniques. For instance, a client device detects the motion or velocity of a virtual camera, which if exceeding certain threshold values, lower-detail image data is loaded and rendered of certain areas. Other examples include: rendering vector-based curves as a series of points, preloading map image data for areas of poor communication with a map service, adapting textures based on display zoom level, or rendering map image data according to complexity.

In some embodiments, client devices communicate utilizing various data formats separate from a map tile. For instance, some client devices implement Assisted Global Positioning Satellites (A-GPS) and communicate with location services that utilize data formats conforming to location service protocols, such as, but not limited to, Radio Resource Location services Protocol (RRLP), TIA 801 for Code Division Multiple Access (CDMA), Radio Resource Control (RRC) position protocol, or LTE Positioning Protocol (LPP). Client devices may also receive GPS signals directly. Embodiments may also send data, with or without solicitation from a map service, identifying the client device's capabilities or attributes (e.g., hardware specifications or operating system version) or communication capabilities (e.g., device communication bandwidth as determined by wireless signal strength or wire or wireless network type).

FIG. 13 illustrates one possible embodiment of an operating environment 1300 for a map service 1330 and client devices 1302a-1302c. In some embodiments, devices 1302a, 1302b, and 1302c communicate over one or more wire or wireless networks 1310. For example, wireless network 1310, such as a cellular network, can communicate with a wide area network (WAN) 1320, such as the Internet, by use of gateway 1314. A gateway 1314 in some embodiments provides a packet oriented mobile data service, such as General Packet Radio Service (GPRS), or other mobile data service allowing wireless networks to transmit data to other networks, such as wide area network 1320. Likewise, access device 1312 (e.g., IEEE 802.11g wireless access device) provides communication access to WAN 1320. Devices 1302a and 1302b can be any portable electronic or computing device capable of communicating with a map service. Device 1302c can be any non-portable electronic or computing device capable of communicating with a map service.

In some embodiments, both voice and data communications are established over wireless network 1310 and access device 1312. For instance, device 1302a can place and receive phone calls (e.g., using voice over Internet Protocol (VoIP) protocols), send and receive e-mail messages (e.g., using Simple Mail Transfer Protocol (SMTP) or Post Office Protocol 3 (POP3)), and retrieve electronic documents and/or streams, such as web pages, photographs, and videos, over wireless network 1310, gateway 1314, and WAN 1320 (e.g., using Transmission Control Protocol/Internet Protocol (TCP/IP) or User Datagram Protocol (UDP)). Likewise, in some implementations, devices 1302b and 1302c can place and receive phone calls, send and receive e-mail messages, and retrieve electronic documents over access device 1312 and WAN 1320. In various embodiments, any of the illustrated client device may communicate with map service 1330 and/or other service(s) 1350 using a persistent connection established in accordance with one or more security protocols, such as the Secure Sockets Layer (SSL) protocol or the Transport Layer Security (TLS) protocol.

Devices 1302a and 1302b can also establish communications by other means. For example, wireless device 1302a can communicate with other wireless devices (e.g., other devices 1302b, cell phones, etc.) over the wireless network 1310. Likewise devices 1302a and 1302b can establish peer-to-peer communications 1340 (e.g., a personal area network) by use of one or more communication subsystems, such as Bluetooth® communication from Bluetooth Special Interest Group, Inc. of Kirkland, Wash. Device 1302c can also establish peer to peer communications with devices 1302a or 1302b (not shown). Other communication protocols and topologies can also be implemented. Devices 1302a and 1302b may also receive Global Positioning Satellite (GPS) signals from GPS satellites 1360.

Devices 1302*a*, 1302*b*, and 1302*c* can communicate with map service 1330 over the one or more wire and/or wireless networks, 1310 or 1312. For instance, map service 1330 can provide a map service data to rendering devices 1302*a*, 1302*b*, and 1302*c*. Map service 1330 may also communicate with other services 1350 to obtain data to implement map services. Map service 1330 and other services 1350 may also receive GPS signals from GPS satellites 1360.

In various embodiments, map service 1330 and/or other service(s) 1350 are configured to process search requests from any of client devices. Search requests may include but are not limited to queries for business, address, residential locations, points of interest, or some combination thereof. Map service 1330 and/or other service(s) 1350 may be configured to return results related to a variety of parameters including but not limited to a location entered into an address bar or other text entry field (including abbreviations and/or other shorthand notation), a current map view (e.g., user may be viewing one location on the multifunction device while residing in another location), current location of the user (e.g., in cases where the current map view did not include search results), and the current route (if any). In various embodiments, these parameters may affect the composition of the search results (and/or the ordering of the search results) based on different priority weightings. In various embodiments, the search results that are returned may be a subset of results selected based on specific criteria include but not limited to a quantity of times the search result (e.g., a particular point of interest) has been requested, a measure of quality associated with the search result (e.g., highest user or editorial review rating), and/or the volume of reviews for the search results (e.g., the number of times the search result has been review or rated).

In various embodiments, map service 1330 and/or other service(s) 1350 are configured to provide auto-complete search results that are displayed on the client device, such as within the mapping application. For instance, auto-complete search results may populate a portion of the screen as the user enters one or more search keywords on the multifunction device. In some cases, this feature may save the user time as the desired search result may be displayed before the user enters the full search query. In various embodiments, the auto complete search results may be search results found by the client on the client device (e.g., bookmarks or contacts), search results found elsewhere (e.g., from the Internet) by map service 1330 and/or other service(s) 1350, and/or some combination thereof. As is the case with commands, any of the search queries may be entered by the user via voice or through typing. The multifunction device may be configured to display search results graphically within any of the map display described herein. For instance, a pin or other graphical indicator may specify locations of search results as points of interest. In various embodiments, responsive to a user selection of one of these points of interest (e.g., a touch selection, such as a tap), the multifunction device is configured to display additional information about the selected point of interest including but not limited to ratings, reviews or review snippets, hours of operation, store status (e.g., open for business, permanently closed, etc.), and/or images of a storefront for the point of interest. In various embodiments, any of this information may be displayed on a graphical information card that is displayed in response to the user's selection of the point of interest.

In various embodiments, map service 1330 and/or other service(s) 1350 provide one or more feedback mechanisms to receive feedback from client devices 1302*a*-1302*c*. For instance, client devices may provide feedback on search results to map service 1330 and/or other service(s) 1350 (e.g., feedback specifying ratings, reviews, temporary or permanent business closures, errors etc.); this feedback may be used to update information about points of interest in order to provide more accurate or more up-to-date search results in the future. In some embodiments, map service 1330 and/or other service(s) 1350 may provide testing information to the client device (e.g., an A/B test) to determine which search results are best. For instance, at random intervals, the client device may receive and present two search results to a user and allow the user to indicate the best result. The client device may report the test results to map service 1330 and/or other service(s) 1350 to improve future search results based on the chosen testing technique, such as an A/B test technique in which a baseline control sample is compared to a variety of single-variable test samples in order to improve results.

While the invention has been described with reference to numerous specific details, one of ordinary skill in the art will recognize that the invention can be embodied in other specific forms without departing from the spirit of the invention. For instance, many of the figures illustrate various touch gestures (e.g., swipe gestures, pinch gestures, spread gestures, etc.). However, many of the illustrated operations could be performed via different touch gestures (e.g., a swipe instead of a tap, etc.) or by non-touch input (e.g., using a cursor controller, a keyboard, a touchpad/trackpad, a near-touch sensitive screen, etc.). In addition, a number of the figures (including FIG. 9) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A non-transitory machine-readable medium storing a mapping application which when executed on a device by at least one processing unit renders views of a three-dimensional (3D) map, the mapping application comprising sets of instructions for:

requesting a first set of map tiles associated with a portion of the 3D map for display at a particular 3D angled perspective view;

in response to the request, receiving a second set of map tiles associated with the portion of the 3D map, the second set of map tiles a subset of the first set of map tiles;

identifying a third set of map tiles included in the first set of map tiles but missing from the second set of map tiles;

identifying distance information from a subset of the second set of map tiles;

for each missing map tile in the third set of map tiles, generating a replacement map tile for replacing the missing map tile, the replacement map tile comprising geospatial data based on the identified distance information; and rendering the portion of the 3D map using the second set of map tiles and the replacement map tiles, wherein both the second set of map tiles and the replacement map tiles are rendered at the particular 3D angled perspective view.

2. The non-transitory machine-readable medium of claim 1, wherein the mapping application further comprises sets of instructions for:
  defining a virtual camera for identifying portions of the 3D map to render;
  requesting from the virtual camera a view of the 3D map to render; and
  in response to the request, receiving the portion of the 3D map to render.

3. The non-transitory machine-readable medium of claim 1, wherein the geospatial data comprises longitude and latitude data.

4. The non-transitory machine-readable medium of claim 1, wherein the geospatial data comprises data representing distances to a nearest map tile in the second set of map tiles.

5. The non-transitory machine-readable medium of claim 1, wherein the geospatial data comprises a scale that indicates a set of distances of the portion of the 3D map.

6. The non-transitory machine-readable medium of claim 1, wherein the geospatial data comprises distances of a geographical region represented by the portion of the 3D map.

7. The non-transitory machine-readable medium of claim 1, wherein the mapping application further comprises a set of instructions for displaying the rendered replacement map tiles showing a real world distance represented by each of the map tiles.

8. The non-transitory machine-readable medium of claim 1, wherein the set of instructions for requesting the first set of map tiles is executed in response to an adjustment of the 3D map.

9. For a mapping application, a method for rendering a view of a three-dimensional (3D) map to display on a device, the method comprising:
  requesting a first set of map tiles associated with a portion of the 3D map for display at a particular 3D angled perspective view;
  in response to the request, receiving a second set of map tiles associated with the portion of the 3D map, the second set of map tiles a subset of the first set of map tiles;
  identifying a third set of map tiles included in the first set of map tiles but missing from the second set of map tiles;
  identifying distance information from a subset of the second set of map tiles;
  for each missing map tile in the third set of map tiles, generating a replacement map tile for replacing the missing map tile, the replacement map tile comprising geospatial data based on the identified distance information; and
  rendering the portion of the 3D map using the second set of map tiles and the replacement map tiles, wherein both the second set of map tiles and the replacement map tiles are rendered at the particular 3D angled perspective view.

10. The method of claim 9 further comprising:
  defining a virtual camera for identifying portions of the 3D map to render;
  requesting from the virtual camera a view of the 3D map to render; and
  in response to the request, receiving the portion of the 3D map to render.

11. The method of claim 9, wherein the geospatial data comprises longitude and latitude data.

12. The method of claim 9, wherein the geospatial data comprises data representing distances to a nearest map tile in the second set of map tiles.

13. The method of claim 9, wherein the geospatial data comprises a scale that indicates a set of distances of the portion of the 3D map.

14. The method of claim 9, wherein the geospatial data comprises distances of a geographical region represented by the portion of the 3D map.

15. The method of claim 9 further comprising displaying the rendered replacement map tiles showing a real world distance represented by each of the map tiles.

16. The method of claim 9, wherein the first set of map tiles is requested in response to an adjustment of the 3D map.

17. An electronic device comprising:
  a set of processing units; and
  a non-transitory machine-readable medium storing a mapping application which when executed by at least one of the processing units renders views of a three-dimensional (3D) map, the mapping application comprising sets of instructions for:
    requesting a first set of map tiles associated with a portion of the 3D map for display at a particular 3D angled perspective view;
    in response to the request, receiving a second set of map tiles associated with the portion of the 3D map, the second set of map tiles a subset of the first set of map tiles;
    identifying a third set of map tiles included in the first set of map tiles but missing from the second set of map tiles;
    identifying distance information from a subset of the second set of map tiles;
    for each missing map tile in the third set of map tiles, generating a replacement map tile for replacing the missing map tile, the replacement map tile comprising geospatial data based on the identified distance information; and
    rendering the portion of the 3D map using the second set of map tiles and the replacement map tiles, wherein both the second set of map tiles and the replacement map tiles are rendered at the particular 3D angled perspective view.

18. The electronic device of claim 17, wherein the mapping application further comprises sets of instructions for:
  defining a virtual camera for identifying portions of the 3D map to render;
  requesting from the virtual camera a view of the 3D map to render; and
  in response to the request, receiving the portion of the 3D map to render.

19. The electronic device of claim 17, wherein the geospatial data comprises longitude and latitude data.

20. The electronic device of claim 17, wherein the geospatial data comprises data representing distances to a nearest map tile in the second set of map tiles.

21. The electronic device of claim 17, wherein the geospatial data comprises a scale that indicates a set of distances of the portion of the 3D map.

22. The electronic device of claim 17, wherein the geospatial data comprises distances of a geographical region represented by the portion of the 3D map.

23. The electronic device of claim 17, wherein the mapping application further comprises a set of instructions for displaying the rendered replacement map tiles showing a real world distance represented by each of the map tiles.

* * * * *